US010685428B2

(12) United States Patent
Wang et al.

(10) Patent No.: US 10,685,428 B2
(45) Date of Patent: Jun. 16, 2020

(54) SYSTEMS AND METHODS FOR SUPER-RESOLUTION SYNTHESIS BASED ON WEIGHTED RESULTS FROM A RANDOM FOREST CLASSIFIER

(71) Applicant: Hong Kong Applied Science and Technology Research Institute Co., Ltd., Shatin (HK)

(72) Inventors: Yan Wang, Sha Tin (HK); Hailiang Li, Tai Po (HK); Yang Liu, Kowloon (HK); Man Yau Chiu, Ma On Shan (HK); Zhi Bin Lei, Kornhill (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 83 days.

(21) Appl. No.: 16/185,860

(22) Filed: Nov. 9, 2018

(65) Prior Publication Data
US 2020/0151852 A1    May 14, 2020

(51) Int. Cl.
*G06K 9/36* (2006.01)
*G06T 3/40* (2006.01)
(Continued)

(52) U.S. Cl.
CPC ........ *G06T 3/4053* (2013.01); *G06K 9/00228* (2013.01); *G06K 9/00281* (2013.01);
(Continued)

(58) Field of Classification Search
CPC ..... G06T 3/4053; G06T 5/003; G06T 11/001; H04N 7/0125; G06K 9/66
(Continued)

(56) References Cited

U.S. PATENT DOCUMENTS 8,744,172 B2    6/2014  Tsymbal et al.
10,261,976 B2*  4/2019  Kang .............. G06F 30/20
(Continued)

FOREIGN PATENT DOCUMENTS

CN    103971112 A    8/2014
CN    104298973 A    1/2015
(Continued)

OTHER PUBLICATIONS

International Search Report and Written Opinion issued for PCT Application No. PCT/CN2018/115277, dated Aug. 20, 2019, 10 pages.

*Primary Examiner* — Charlotte M Baker
(74) *Attorney, Agent, or Firm* — Norton Rose Fullbright US LLP

(57) ABSTRACT

Methods and systems which provide super-resolution synthesis based on weighted results from a random forest classifier are described. Embodiments apply a trained random forest classifier to low-resolution patches generated from the low-resolution input image to classify the low-resolution input patches. As each low-resolution patch is fed into the random forest classifier, each decision tree in the random forest classifier "votes" for a particular class for each of the low-resolution patches. Each class is associated with a projection matrix. The projection matrices output by the decision trees are combined by a weighted average to calculate an overall projection matrix corresponding to the random forest classifier output, which is used to calculate a high-resolution patch for each low-resolution patch. The high-resolution patches are combined to generate a synthesized high-resolution image corresponding to the low-resolution input image.

20 Claims, 9 Drawing Sheets

(51) Int. Cl.
 *G06K 9/00* (2006.01)
 *G06T 5/50* (2006.01)
 *G06T 7/73* (2017.01)
(52) U.S. Cl.
 CPC ............ *G06K 9/00288* (2013.01); *G06T 5/50* (2013.01); *G06T 7/75* (2017.01)
(58) Field of Classification Search
 USPC ............... 382/276; 348/159, 211.99, E5.042, 348/E7.085
 See application file for complete search history.

(56) References Cited

U.S. PATENT DOCUMENTS

| | | | | |
|---|---|---|---|---|
| 2010/0149338 | A1* | 6/2010 | Aggarwal | ............ H04N 5/2258 348/159 |
| 2015/0269708 | A1 | 9/2015 | Porikli et al. | |
| 2019/0197667 | A1* | 6/2019 | Paluri | ................. G06K 9/4652 |

FOREIGN PATENT DOCUMENTS

| | | | |
|---|---|---|---|
| CN | 106203256 | A | 12/2016 |
| CN | 106339984 | A | 1/2017 |
| CN | 106529586 | A | 3/2017 |
| CN | 106780333 | A | 5/2017 |
| CN | 107123139 | A | 9/2017 |
| CN | 107437077 | A | 12/2017 |
| CN | 107563391 | A | 1/2018 |
| EP | 1591959 | A1 | 11/2005 |

* cited by examiner

SYSTEMS AND METHODS FOR SUPER-RESOLUTION SYNTHESIS BASED ON WEIGHTED RESULTS FROM A RANDOM FOREST CLASSIFIER

TECHNICAL FIELD

The present invention relates generally to image synthesis and, more specifically, to super-resolution synthesis based on weighted results from a random forest classifier.

BACKGROUND OF THE INVENTION

Images, such as images that may be captured by motion or still image cameras, are commonly used in a number of fields, including security, retail, entertainment, etc. For example, images may be used for detecting and tracking persons, facial recognition, flow/people-counting, quality control, and/or many other image based applications. In many instances, the images captured may be low-resolution images and may not provide enough detail for precise applications. For example, a low-resolution image may be insufficient to perform facial recognition due to the lack of detailed visual data. A challenge is how to enhance the resolution of the low-resolution image to render it suitable for appropriate operations.

One technique that has been developed to address the insufficiency of the low-resolution images involves extracting image features from a low-resolution image by applying a random forest algorithm based on a framework of the Active Shape Model (ASM) algorithm. Under this approach, feature points (e.g., facial landmarks) of the low-resolution image are adjusted using a generic ASM to fit on a real face by applying a random forest. However, this approach is not sufficiently robust to generate and/or synthesize a high-resolution image from the low-resolution image as it merely adjusts feature points of a model rather than constructing a high-resolution image.

As noted above, images may be used for flow-counting or people-counting in environments with a high volume of human traffic, such as shopping malls, railway stations, traffic intersections, etc. Flow/people-counting is important for safety considerations, such as in environments with limited capacity. Flow/people-counting is also important for marketing research, among other things. Marketing research organizations may have a high demand for analysis on the flow of consumers to determine marketing strategies. Previously, flow/people-counting and monitoring systems used infrared or thermal sensing instruments to detect and count persons. More recently, flow/people-counting systems make use of video images captured by cameras to detect and count people.

In these systems, using video data, the number of people may be counted based on the identification of either whole or certain parts of the human body. For example, in one existing approach, a camera captures a view from the top and a count line is set on the image frame. Shape, texture, and color information, is extracted from the captured images, and the information is used for identifying human heads. The number of heads passing through the count line is then counted. In another existing approach, a camera is used to detect faces in the images. Every face detected is counted as a person. However, under these approaches, interferences on the image may affect the detection of the heads and may affect the count. For example, faces in the images may be occluded or otherwise blocked, facial landmarks of the image may be incomplete, and/or light distribution in the image may affect the resolution of the image, which may prevent detection of the head and/or face. Additionally, when the interference ceases and the person re-appears, these approaches may re-detect the person and re-count the person, as there is no mechanism to determine that the person has already been counted in these approaches.

Another approach to flow/people counting proposes an algorithm to synthesize a frontal face by applying an Active Appearance Model (AAM) search and estimating an orientation angle of the face. This approach may be used in cases where a face may be incomplete because it is not frontally aligned, and is instead oriented at an angle. In this approach, the AAM orientation angle is applied to the incomplete face and the face is warped by that angle. However, this approach is inaccurate as it merely relies on the estimation of the orientation angle, and is unable to prevent duplicate counting of persons when the person re-appears after being occluded.

BRIEF SUMMARY OF THE INVENTION

The present invention is directed to systems and methods which provide for super-resolution synthesis based on weighted results from a random forest classifier according to embodiments of the invention. As used herein, super-resolution synthesis may refer to synthesizing a high-resolution image from a low-resolution image, such that the high-resolution image corresponds to the low-resolution image. For example, embodiments of the present disclosure provide for synthesizing a high-resolution image corresponding to a low-resolution input image by applying a trained random forest classifier to low-resolution input patches generated from the low-resolution input image to classify the low-resolution input patches. The low-resolution input patches may correspond to particular landmarks in the low-resolution input image, and/or may be centered on a particular landmark. In aspects, the particular landmarks may include facial landmarks. As used herein, facial landmarks may refer to landmarks on the face that include specific facial features such as nose, left eye, right eye, left eye corner, right eye corner, mouth, mouth right corner, mouth left corner, left cheek, right cheek, forehead, etc., and/or landmarks on the face that do not include a specific facial feature but may correspond to a particular location/position/point on the face. In embodiments, each particular landmark may be associated with a random forest classifier. In these cases, a plurality of random forest classifiers may be available for classifying the low-resolution input patches, where each random forest classifier in the plurality of random forest classifiers is associated with a particular landmark. As the low-resolution input patches are fed into the random forest classifiers, the decision trees of a particular random forest classifier may "vote" for a particular class for the corresponding low-resolution input patch. Thus, the classification of the low-resolution input patches by the respective random forest classifier may include obtaining a plurality of class votes for the low-resolution input patches, where the class votes are cast by corresponding decision trees. In embodiments, the decision trees of a particular random forest classifier may cast class votes for a low-resolution input patch of a corresponding landmark fed into the random forest classifier. Therefore, for each low-resolution input patch, the output of a decision trees of the corresponding random forest classifier may be a vote for a particular class. Classes in the output domain of the random forest classifiers may be associated with a projection matrix. In some embodiments, as will be discussed in more detail below, each class on the output domain of a particular random forest classifier may correspond to variations on a particular landmark (e.g., type, state, etc.) corresponding to the random forest classifier. The output of each decision tree may be a projection matrix for the class voted by the individual decision trees. In accordance with embodiments of the invention, the projection matrices output by the decision trees for a particular low-resolution patch may be combined by a weighted average to calculate an overall projection matrix for the particular low-resolution patch corresponding to the corresponding random forest classifier output. The overall projection matrix for each low-resolution input patch may then be used to calculate a corresponding high-resolution patch for each low-resolution input patch. The calculated high-resolution patches for each low-resolution input patch may be combined/integrated to generate a synthesized high-resolution image corresponding to the low-resolution input image.

In embodiments, the random forest classifier may be trained before being applied to the low-resolution input patches. The training of the random forest classifier may be implemented using low-resolution patches generated from a training set of high-resolution images, from which the high-resolution patches are obtained. In some embodiments, the training high-resolution images may be broken up into the high-resolution patches and downscaled into low-resolution training images. The low-resolution training images may then be broken up into low-resolution training patches, where each low-resolution training patch may correspond to, and/or may be centered on, a facial landmark. The low-resolution training patches may be used to train the decision trees of the random forest classifier.

In some embodiments, each high-resolution patch may be paired with a corresponding low-resolution training patch. In these cases, for each facial landmark, there may be a plurality of high-resolution/low-resolution patch pairs, where each pair may represent a variation and/or different type of the facial landmark, including the facial landmarks not corresponding to a facial feature, at the location of the high-resolution/low-resolution patch pair within the corresponding images. A trained random forest classifier corresponding to a particular facial landmark may be used to classify the corresponding low-resolution training patches and the high-resolution patches into classes. As noted above, the classes may represent the different types and/or variations of high-resolution/low-resolution patches centered on the facial landmark. A projection matrix may be calculated for each class using all corresponding high-resolution/low-resolution patch pairs in each particular class. The projection matrices may be used to calculate the high-resolution patches during operations.

In additional or alternative embodiments, a particular implementation of super-resolution synthesis based on weighted results from a random forest classifier may be provided in flow/people-counting operations. In these embodiments, an advantageous approach for solving the problems associated with flow/people counting applications may be provided in which face recognition functionality may be used to prevent duplicate counting of persons by basing the counting on whether a particular face has been previously recognized. As such, as noted above, when a face re-appears after being occluded, the face will only be counted if it is a face not previously detected. In embodiments, the face recognition functionality may comprise the super-resolution synthesis technique described herein.

Another advantageous approach in the flow/people-counting techniques described herein may include providing parallel detection of heads and faces, which provides a more precise and efficient way of flow/people-counting over existing systems. Using parallel detection of heads and faces may reduce duplicated counting of people as well as increase the detection rate of faces, as the head detection operations may be able to detect faces that may not be detected by the face detection operations.

As noted above, super-resolution synthesis may include synthesizing a high-resolution image from a low-resolution image, such that the high-resolution image corresponds to the low-resolution image. For example, a low-resolution image may contain a face. As noted above, the low-resolution image may not be suitable for facial-recognition applications, as it may be difficult or even not possible to accurately recognize the face due to the low-resolution. In accordance with the super-resolution synthesis techniques of embodiments, a high-resolution image corresponding to the low-resolution image may be synthesized, where the high-resolution image may allow for the face contained within, which may correspond to the face in the low-resolution image, to be accurately recognized. It is also noted that, as used herein, images may refer to digital images. The digital images may have been captured digitally, using digital capture devices, or may be digital images scanned from non-digital images. Additionally, the operations and processes applied to the images as described herein may include digital processing of the images.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE INVENTION

Super-Resolution Synthesis

Figure 1:
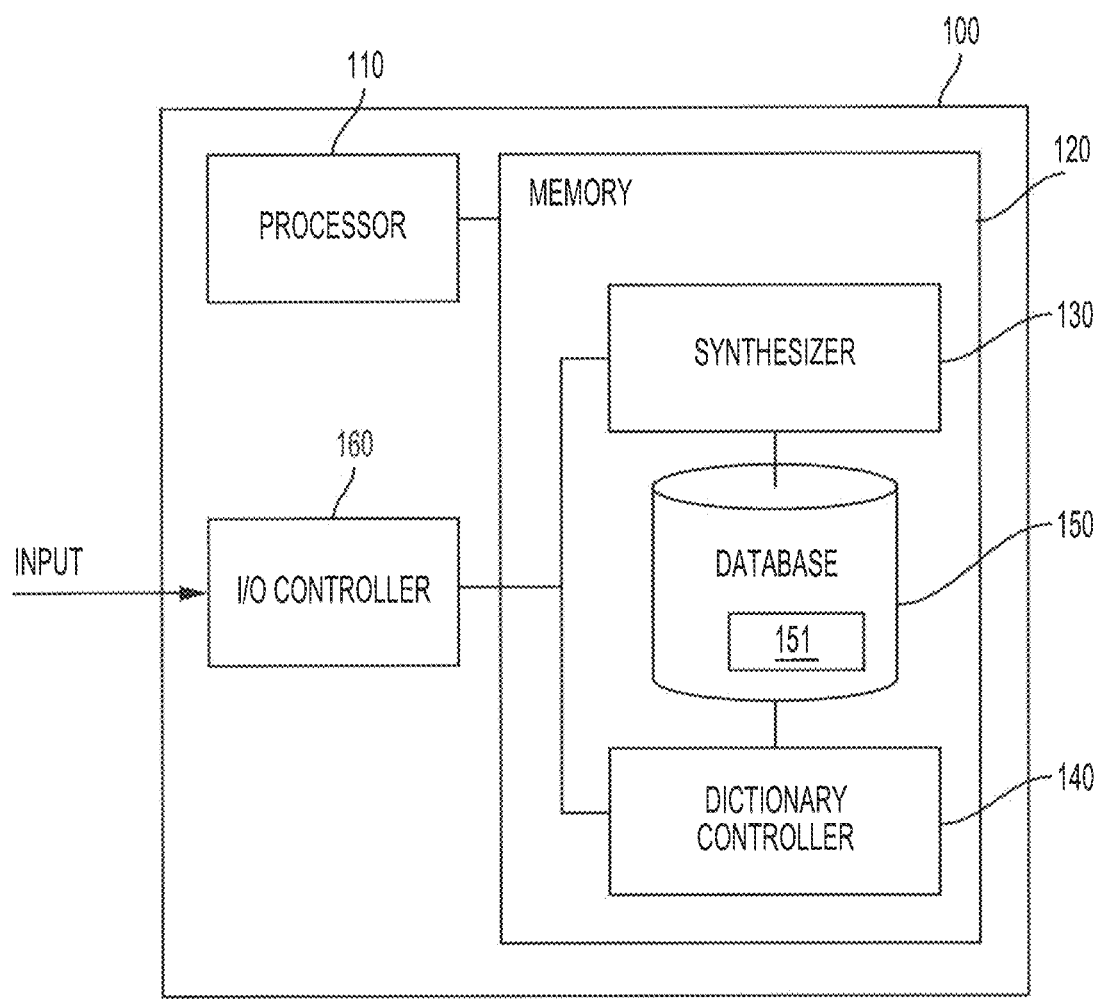
FIG. 1 shows a block diagram of a system configured to provide super-resolution synthesis based on weighted results from a random forest classifier in accordance with embodiments of the present invention.

FIG. 1 shows a block diagram of a system configured to provide super-resolution synthesis based on weighted results from a random forest classifier according to embodiments of the invention. System 100 of the illustrated embodiment includes processor 110, memory 120, synthesizer 130, dictionary controller 140, database 150, and input/output (I/O) controller 160. The various components of system 100 may cooperatively operate to provide functionality in accordance with the discussion herein. For example, low-resolution images (e.g., still images, moving images, video stream, image stream, etc.) may be provided as an input to system 100. The various components of system 100 may cooperatively operate to synthesize a high-resolution image corresponding to a low-resolution image from the input by applying trained random forest classifiers to low-resolution patches created from the low-resolution input image to calculate high-resolution patches, based on high-resolution patches in a feature dictionary, from weighted results from the random forest classifier. The calculated high-resolution patches may be combined/integrated to generate a synthesized high-resolution image corresponding to the low-resolution input image.

In embodiments, system 100 may also be configured to train the random forest classifiers and to build the feature dictionary. The functionality of system 100 to train the random forest classifiers and to build the feature dictionary will be discussed in more detail below. It is also noted that in some embodiments, separate systems may be used for providing super-resolution synthesis, for training the random forest classifiers, and for building the feature dictionary. In these cases, the operations of the separate systems to provide the respective functionality may be in accordance with aspects of the present invention as described herein.

It is noted that various components of system 100 are illustrated as single and separate components in FIG. 1. However, it will be appreciated that each of the various components of system 100 may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

It is also noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

Processor 110 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 110 may comprise code segments (e.g., software, firmware, and/or hardware logic) executable in hardware, such as a processor, to perform the tasks and functions described herein. In yet other aspects, processor 110 may be implemented as a combination of hardware and software. Processor 110 may be communicatively coupled to memory 120.

Memory 120 may comprise one or more semiconductor memory device, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 120 may comprise a processor readable medium configured to store one or more instruction sets (e.g., software, firmware, etc.) which, when executed by a processor (e.g., one or more processors of processor 110), perform tasks and functions as described herein.

Memory 120 may also be configured to facilitate storage operations. For example, memory 120 may comprise database 150 for storing image patches (e.g., high-resolution and/or low-resolution patches as described in more detail below), feature dictionary 151, and/or the random forest classifiers of embodiments. Database 150 is illustrated as integrated into memory 120, but may be provided as a separate storage module. Additionally or alternatively, database 150 may be a single database, or may be a distributed database implemented over a plurality of database modules. As will be described in more detail, feature dictionary 151 stored in database 150 may be used to facilitate synthesizing a high-resolution image from a low-resolution image based on weighted results from a random forest classifier.

I/O controller 160 may be configured to facilitate input and output operations for system 100. I/O controller 160 may be communicatively coupled to synthesizer 130 and dictionary controller 140. In some embodiments, I/O controller 160 may be configured to receive an image input (e.g., streamed video, recorded video, still images, feature vectors, etc.) from an external module or device, or may be configured to obtain an image input from database 150. The image input may be a digital image. In other embodiments, I/O controller 160 may comprise an image capture device (e.g., a video camera, digital image camera, motion picture camera, automation system imaging equipment, etc.). The input image may be a high-resolution image, or may be a low-resolution image. In aspects, I/O controller 160 may provide the input image to dictionary controller 140 to be used for training the random forest classifiers and/or building feature dictionary 151. In other aspects, I/O controller 160 may provide the input image to synthesizer 130 to be used for calculating a high-resolution patch to synthesize a high-resolution image. I/O controller 160 may also be configured to provide output representing a high-resolution image synthesized in accordance with aspects of the present disclosure.

Synthesizer 130 may be configured to synthesize a high-resolution image from a low-resolution input image (e.g., a low-resolution image received via I/O controller 160) based on weighted results from trained random forest classifiers. In embodiments, the low-resolution input image may be divided and/or broken up into low-resolution patches, and the low-resolution patches may be classified by the trained random forest classifiers. For each low-resolution patch, a plurality of projection matrices may be output from the trained random forest classifier. The plurality of projection matrices for each low-resolution patch may be combined by a weighted average to generate an overall projection matrix. The overall projection matrix may be used to calculate a high-resolution patch corresponding to the low-resolution patch. A high-resolution patch may be calculated for every low-resolution patch obtained from the low-resolution input image. The calculated high-resolution patches may then be combined/integrated to generate the synthesized high-resolution image. The functionality of synthesizer 130 to synthesize a high-resolution image from a low-resolution input image based on weighted results from trained random forest classifiers will be described in more detail below.

Dictionary controller 140 may be configured to train the random forest classifiers and to build feature dictionary 151. In embodiments, high-resolution/low-resolution patch pairs may be used to train the random forest classifiers. Each of the trained random forest classifiers may be used to classify the high-resolution/low-resolution patch pairs and to calculate projection matrices for each class. The projection matrices may be used to build feature dictionary 151. In some aspects, feature dictionary 151 may store the projection matrices calculated from the resolution/low-resolution patch pairs. The projection matrices calculated from the resolution/low-resolution patch pairs may be sufficient to represent high-resolution/low-resolution patch pairs, which may allow, in some implementations, system 100 of embodiments to forego storing the image patches in the database, as the image patches may have a large size. In embodiments, the projection matrices of feature dictionary 151 and the trained random forest classifiers may be portable to another system. In that case, the other system may be configured to use the projection matrices and the trained random forest classifiers to provide super-resolution synthesis functionality according to the features of the present disclosure, without having to store high-resolution and/or low-resolution patches.

In some aspects, high-resolution patches may be generated from high-resolution images, by dividing and/or breaking up a high-resolution image into portions of the high-resolution image, and taking the portion as high-resolution patches. In some embodiments, the portions into which the high-resolution images are divided may correspond to landmarks in the high-resolution image (e.g., facial landmarks, symbols, characters, letters, number, particular objects, particular shapes, etc.), or may correspond to portions of a fixed size in the high-resolution image. In some embodiments, the high-resolution images may be downscaled into low-resolution images. As with the high-resolution images, the low-resolution images may be divided and/or broken up into portions, such as based on landmarks (e.g., facial landmarks, symbols, characters, letters, number, particular objects, particular shapes, etc.) or based on fixed size portions, and the portions may be taken as the low-resolution patches. In other embodiments, the high-resolution patches may be downscaled into corresponding low-resolution patches. As will be appreciated from the foregoing, each of the high-resolution patches may be paired with a corresponding low-resolution patch based on the particular landmark contained in the high-resolution and low-resolution patches.

In embodiments, the high-resolution/low-resolution patch pairs may be classified into classes of a corresponding landmark using a random forest classifier. The result of the classification of each high-resolution/low-resolution patch pair corresponding to a particular landmark may be used to generate a projection matrix for each class in the output domain of the corresponding random forest classifier. In embodiments, feature dictionary 151 may comprise the projection matrices calculated for the different classes and/or landmarks. The projection matrices calculated for the different classes and/or landmarks may be used during operation by synthesizer 130 to calculate high-resolution patches. These features of dictionary controller 140 will be described in more detail below.

Before the high-resolution/low-resolution patch pairs are classified using the random forest classifiers, the random forest classifiers may be trained. As described in more detail below, low-resolution patches associated with each particular landmark may be used to train the respective random forest classifier. In embodiments, each random forest classifier may be associated with a different landmark. For example, a different random forest classifier may be provided for different facial landmarks, including facial landmarks corresponding to a facial features, e.g., nose, left eye, right eye, left eye corner, right eye corner, mouth, mouth right corner, mouth left corner, left cheek, right cheek, forehead, etc., and facial landmarks not corresponding to a facial feature but corresponding to a facial point. It is noted that the classes into which the high-resolution/low-resolution patch pairs are classified may be associated with a particular variation and/or type of the corresponding facial landmark. For example, high-resolution/low-resolution patch pairs corresponding to a facial landmark on "mouth" may be classified into classes that include "open mouth," "closed mouth," etc., as well as different types of "mouths," such as mouths resembling a particular celebrity when opened or closed, etc. In another example, high-resolution/low-resolution patch pairs corresponding to a facial point on left side of the forehead may be classified into classes that include variations of the facial point on left side of the forehead. In embodiments, each high-resolution/low-resolution patch pair of the high-resolution/low-resolution patch pairs used to train the corresponding random forest classifier may correspond to a different variation and/or type of the facial landmark. It is noted that there may be variations and/or different types of wrinkles at the eye corners, nose corners, mouth corners, etc. Similarly, there may be different types of eyes when the eyes are open, (e.g., eyes resembling a particular celebrity), or when the eyes are closed (e.g., eyes resembling another celebrity). In these cases, each different variation and/or type of the facial landmark may be a different class in the output domain of the corresponding random forest classifier. There may also be different classes/types of mouth, cheek, chin, forehead, partial occlusion on the forehead by the hair, etc. As will be discussed in more detail below, low-resolution patches from different face images including these variations may be centered on the same facial landmark and may be used to train the random forest classifier corresponding to the facial landmark.

It will be noted that, in embodiments, each random forest classifier may have a corresponding output domain that includes a set of classes, where each class corresponds to a different variety and/or type of the corresponding facial landmark. For example, for a random forest classifier for a facial landmark on the nose, the output domain may include "downturned nose" type I, type II, type III, . . . , "upturned nose" type A, type B, type C, . . . , etc., where type I, II, III, and/or type A, B, C may indicate variations on the nose due to shapes, skin textures, relative sizes, and/or other features related to the nose. In another example, for a random forest classifier for a facial landmark on the left cheek, may include "slim cheek" type X, type Y, type Z, . . . , "slack cheek" type 1, type 2, type 3 . . . , etc., where type X, Y, Z, and/or type 1, 2, 3 may indicate variations on the cheek due to shapes, skin textures, relative sizes, and/or other features related to the left cheek. It should be appreciated that the discussion above with respect to "nose" and "left cheek" is merely an example, and should not be construed as limiting, as the discussion regarding diversity of high-resolution and/or low-resolution patches centered on facial landmarks may be applicable to any facial landmark. As noted above, a facial landmark may refer to a landmark including a facial feature, or may refer to a facial location/position/point. It will be appreciated that, in some implementations, high-resolution and/or low-resolution patches centered on facial landmarks that include a facial feature may have a particular level of diversity and may be classified into different classes.

Figure 2:
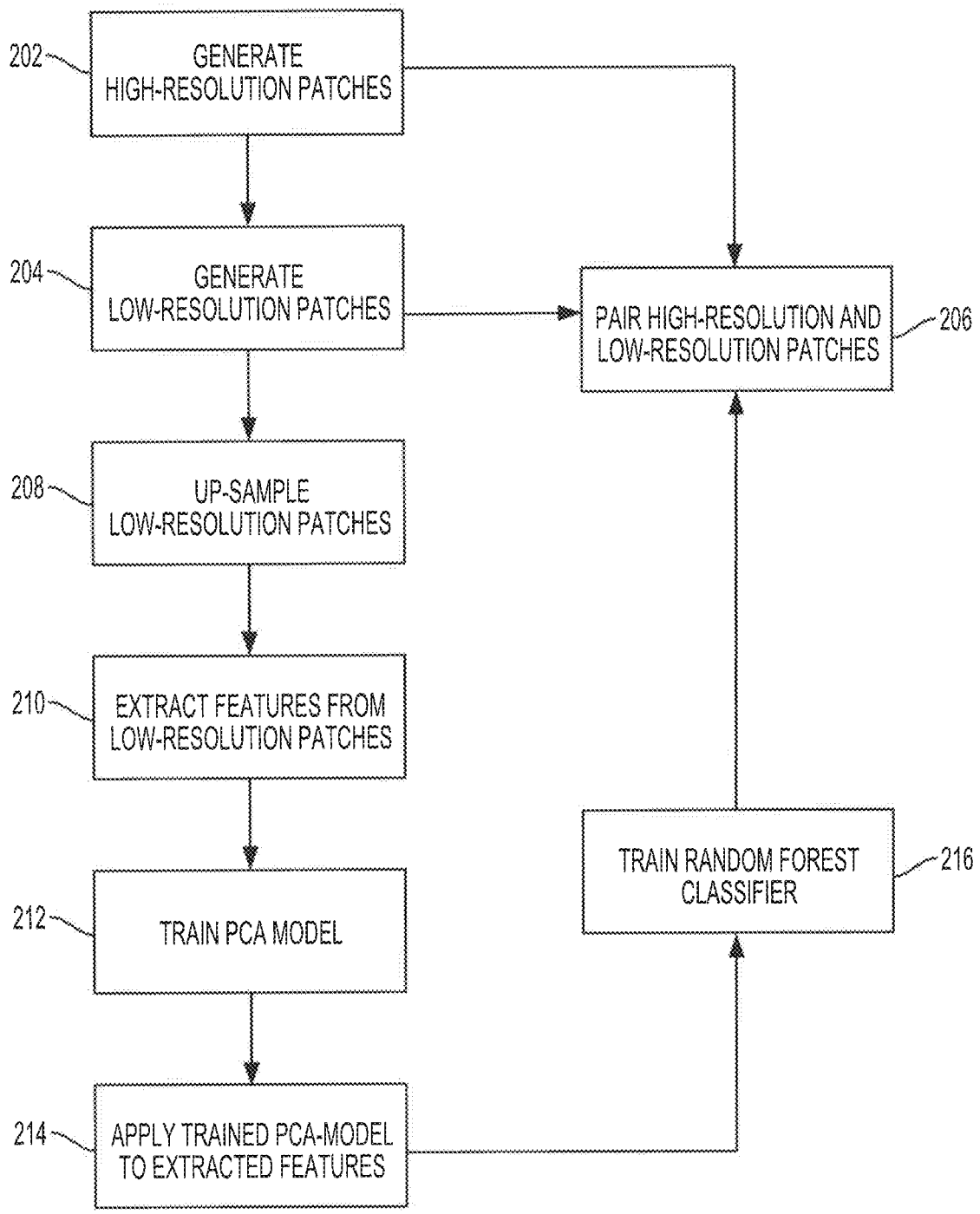
FIG. 2 shows an operational flow diagram illustrating functionality of a dictionary controller to train a random forest classifier in accordance with embodiments of the present invention.

As the random forest classifiers trained from the low-resolution patches may be used to calculate high-resolution patches, which may in turn be used to synthesize a high-resolution image during operations, as will be discussed in more detail below, the diversity of types within the low-resolution patches used to train the random forest classifiers is important according to some embodiments. With a higher level of diversity, the high-resolution image synthesis may be more precise and accurate, as the estimation of the input low-resolution image patches centered on facial landmarks may be more precise. Thus, it is noted that, as the low-resolution patches may be used to train the random forest classifier, and as the low-resolution patches may be generated from the high-resolution patches, or from downscaled high-resolution images, the high-resolution images may include high-resolution images collected based on the diversity the images may provide. For example, in face-recognition implementations, the collection of high-resolution images may be selected based on diversity of high-resolution patches centered on facial landmark features (e.g., different shapes and/or types of mouths, eyes, noses, eyebrows, cheeks, foreheads, etc.), and/or different statuses of the features (e.g., opened, closed, wrinkled, etc.). Thus, as will be appreciated, the collection of high-resolution images for training the random forest classifier selected to include sufficient variety and diversity to synthesize a significant amount of different types of facial structures.
Training the Random Forest Classifier FIG. 2 shows an operational flow diagram illustrating functionality of dictionary controller 140 to train random forest classifiers in accordance with aspects of the present disclosure. As noted above, a random forest classifier may be provided for each facial landmark of interest. Although the discussion that follows may be directed to training a particular random forest classifier, it will be appreciated that the same process may be used to train other random forest classifiers corresponding to other facial landmarks.

A random forest classifier may comprise $N_{tree}$ decision trees, where $N_{tree}$ may be any number including hundreds or thousands of decision trees. Each decision tree in the random forest classifier may receive an input vector, such as a feature vector extracted from an image patch, and may provide a classification for the feature vector. In that sense, each decision tree in the forest may "vote" for a particular class. The output of each decision tree in the random forest classifier (e.g., the vote from each decision tree) may be combined (e.g., by a mean calculation, or a weighted average calculation) to determine an overall random forest classifier output class for the feature vector. In some embodiments, the "votes" from all decision trees in the random forest classifier may be considered, and the class with the largest number of votes may be considered as the overall random forest classifier output class. The random forest classifier may then output the classification, e.g., a class from a number of classes in the output domain of the random forest classifier, for the feature vector. However, before the random forest classifier may be used to classify feature vectors, the random forest classifier is trained with a training dataset according to embodiments of the invention.

As noted above, a training dataset may comprise high-resolution images that may be collected for training and building the feature dictionary. The high-resolution images may be obtained from a database of training high-resolution images, or may be obtained in real-time, e.g., from an image capture device. At block 202, high-resolution patches are generated. In embodiments, the high-resolution patches may be generated by dividing and/or breaking up each of the high-resolution images from the training dataset into high-resolution patches. In some embodiments, the breaking up of the high-resolution images may be based on facial landmarks, with each high-resolution patch corresponding to a facial landmark.

Figure 9:
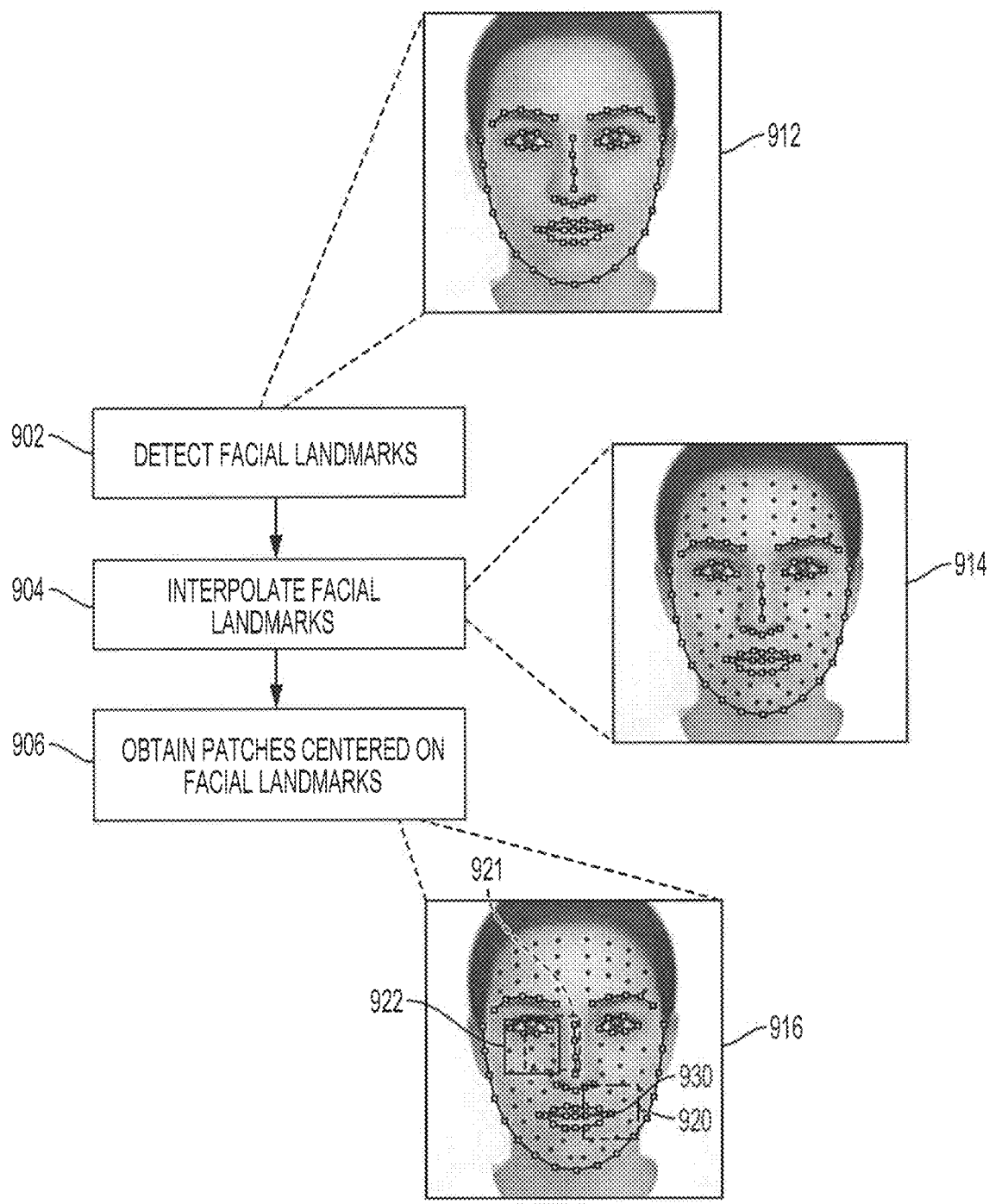
FIG. 9 shows an operational flow diagram illustrating functionality for generating high-resolution patches in accordance with aspects of the present disclosure.

FIG. 9 shows a flow diagram illustrating functionality for generating high-resolution patches in accordance with aspects of the present disclosure. At block 902, facial landmarks are detected. For example, a high-resolution image may be analyzed to detect facial landmarks as shown in high-resolution image 912. In embodiments, the detected facial landmarks may correspond to particular landmarks on different regions of the face, such as eyebrows, eyes, nose, mouth, cheeks, etc. In embodiments, the facial landmarks may be detected using landmark detection algorithms, e.g., Supervised Descent Method (SDM), Local Binary Features (LBF), etc.

At block 904, the original facial landmarks detected at block 902 may be interpolated to generate a set of interpolated facial landmarks. As shown in high-resolution image 914, the interpolated facial landmarks may be in addition to the original facial landmarks. In embodiments, the interpolated facial landmarks may be based on the location of the original facial landmarks. In these cases, the location of each interpolated facial landmark may be calculated based on a relative position of the original landmarks. In some embodiments, the location of each interpolated facial landmark may be calculated based on the position of a particular original facial landmark. For example, an interpolated facial landmark may be generated and positioned based on the location of a landmark on the corner outside corner of the left eye. In some case, more than one interpolated landmarks may be generated based on the relative location of an original facial landmark. The number of interpolated facial landmarks may be predetermined, or may be determined dynamically during operation based on system requirements (e.g., latency, bandwidth, storage, memory, processing power, etc.). In embodiments, the number of interpolated facial landmarks may be determined such that the high-resolution patches generated from the combination of the original facial landmarks and the interpolated facial landmarks cover the entirety of the face region.

At block 906, high-resolution patches are generated for each facial landmark, including the original facial landmarks and the interpolated facial landmarks. As shown in high-resolution image 916, the patches may be generated by obtaining an area centered on a corresponding facial landmark. For example, high-resolution patch 920 may comprise an area centered on facial landmark 930, which may correspond to the left corner of the mouth. The size of the high-resolution patches centered on the facial landmarks may be predetermined, or may be determined dynamically during operation based on system requirements (e.g., latency, bandwidth, storage, memory, processing power, etc.). In some embodiments, high-resolution patches centered on different facial landmarks may overlap. For example, high-resolution patch 921 and high-resolution patch 922 may overlap each other. In embodiments, a high-resolution patch may be generated for each facial landmark detected and interpolated at blocks 902 and 904. In other embodiments, high-resolution patches may be generated for facial landmarks of interest, rather than for every facial landmark.

In embodiments, the process for generating high-resolution patches illustrated in FIG. 9 and discussed above may be performed on every high-resolution image of the training high-resolution images, or may be performed on a selected subset of the training high-resolution images. In any case, for each facial landmark, a plurality of high-resolution patches centered on the facial landmark may be generated, where each high-resolution patch in the plurality may be obtained from different high-resolution images. It is noted that the high-resolution patches centered on a particular facial landmark may include sufficient variety and diversity to synthesize a significant amount of different types of facial structures and/or landmarks. In some embodiments, the size of the high-resolution images may be normalized before the high-resolution patches generation discussed above to ensure that the images in the training high-resolution images is approximately the same size. In embodiments, the normalization of the size of the high-resolution images may include adjusting the size of the high-resolution images such that the distance between the center of one eye and the center of the other eye in the high-resolution image is the same for all training high-resolution images.

Referring back FIG. 2, at block 204, low-resolution patches are generated. In some embodiments, generating the low-resolution patches may include downscaling each of the high-resolution images into a low-resolution image, and then performing the patch generation process described above with respect to FIG. 9. It is noted that, although the patch generation process of FIG. 9 was described with respect to generating high-resolution patches from a high-resolution image, the process may be also applicable for generating low-resolution patches from a low-resolution image. Thus, as with the high-resolution patches, the low-resolution image may be broken up based on facial landmarks and each low-resolution patch generated from a low-resolution image may correspond to a different facial landmark. In other embodiments, the low-resolution patches may be generated directly from the high-resolution patches by downscaling each of the high-resolution patches to generate a corresponding low-resolution patch. In some embodiments, the size of the low-resolution images may be normalized before the low-resolution patches are generated to ensure that the downscaled low-resolution images are approximately the same size. In embodiments, the normalization of the size of the low-resolution images may include adjusting the size of the low-resolution images such that the distance between the center of one eye and the center of the other eye in the low-resolution image is the same for all training low-resolution images. In some embodiments, the low-resolution images may be downscaled from the high-resolution images. In these cases, the size of the high-resolution images may be normalized before the high-resolution images are downscaled into the low-resolution images and, thus, the size of the low-resolution images in these cases are normalized.

At block 206, each high-resolution patch is paired with a low-resolution patch based on the corresponding facial landmark on which the high-resolution patch and the low-resolution patch are centered. For example, a particular high-resolution patch may be centered on a mouth left corner facial landmark. A corresponding low-resolution patch also centered on the same mouth left corner landmark may be paired with the high-resolution patch to generate a high-resolution/low-resolution patch pair for the mouth left corner. As there may be a plurality of high-resolution and low-resolution patches for the mouth left corner facial landmark, due to the variation of types of mouth left corners, there may be a plurality of mouth left corner high-resolution/low-resolution patch pairs. It will be appreciated that in some embodiments, the low-resolution patch in a high-resolution/low-resolution pair may have the same facial landmark as the high-resolution patch, albeit in a lower resolution.

At block 208, the low-resolution patches are up-sampled to the size of the high-resolution patches. For example, the low-resolution patches may have a size expressed as a matrix of 16×16 pixels. Each of the 16×16 low-resolution patch may be up-sampled to a 32×32 matrix. In some implementations, the up-sampling of the low-resolution patches may be performed using bicubic interpolation, or any other technique suitable to up-sample the low-resolution patches to the size of the high-resolution patches. In other embodiments, other up-sampling techniques may be used such as bilinear interpolation, Lanczos resampling, Fourier up-sampling, edge-directed interpolation, etc.

At block 210, a feature vector is extracted from each of the up-sampled low-resolution patches. In embodiments, feature vector extraction may include calculating an edge, texture, shape, and/or other information in a patch, e.g., a low-resolution patch. The feature vector extracted may have a particular dimension. For example, a 32×32 up-sampled low-resolution patch may be processed in accordance with the present disclosure and a feature vector may be extracted from the up-sampled low-resolution patch as a feature vector having a dimension in the order of hundreds, e.g., 300. In some implementations, feature vector extraction may use a Gabor feature vector extraction technique. In the Gabor feature vector extraction technique, filters at different scales and orientations may be calculated and convolved with the low-resolution patch to generate representations matrices of the low-resolution patch. In embodiments, the energy of the representation may be computed, such as by applying a Gabor energy filter, from the representation matrix. The results may be normalized and vectorized into a feature vector. Other feature vector extraction techniques may be used. Different feature extraction techniques may have different complexity and usage requirement, and the particular feature vector extraction technique used at block 210 may depend on system requirements.

A principal component analysis (PCA) model may be used to reduce the dimensionality of a feature vector that is fed into a random forest classifier. For example, as will be described in more detail below, the feature vectors extracted from the up-sampled low-resolution patches may be used to train the random forest classifier. However, the dimensionality of the feature vectors may first be reduced to simplify and optimize the training of the random forest classifier. Before the PCA model may be used to reduce the dimensionality of the feature vectors, the PCA model may be trained using the feature vectors extracted, at block 210, from the up-sampled low-resolution patches. To that end, at block 212, the feature vectors extracted from the up-sampled low-resolution patch are used to train the PCA model. The result may be a trained PCA model that may be configured to reduce the dimensionality of feature vectors, which may then be used to train the random forest classifier.

At block 214, the trained PCA model is applied to the feature vectors extracted, at block 210, from the up-sampled low-resolution patches to generate reduced feature vectors. For example, a feature vector having a dimension in the order of hundreds, e.g., 300, may be reduced by the trained PCA model to a reduced feature vector having a dimension in the order of tens, e.g., 20. The reduced feature vector may simplify and optimize the training of the random forest classifier.

At block 216, the reduced feature vectors are used to train the random forest classifiers. At this point, the training of the random forest classifiers using the reduced feature vectors may be unsupervised, as the reduced feature vectors have not yet been labeled or classified. Moreover, it will be appreciated that each feature vector may correspond to a low-resolution patch centered on a particular facial landmark. As such, feature vectors associated with the same facial landmark may represent different variations and/or types of low-resolution patches centered on the facial landmark. In embodiments, a random classifier may be trained for each facial landmark of interest. For example, for each facial landmark for which high-resolution/low-resolution patch pairs are generated, such as at blocks 202-206, a random forest classifier may be trained.

The training of the random forest classifiers may include growing the decision trees of each random forest using the reduced feature vectors corresponding to the facial landmark associated with the random forest classifier. For example, for a mouth left corner facial landmark, the corresponding random forest classifier is trained using the reduced feature vectors extracted from the low-resolution patches corresponding to the mouth left corner high-resolution/low-resolution patch pairs. In embodiments, a random subset of the reduced feature vectors may be provided to the decision trees of the random forest classifier. The decision trees may be grown by recursively splitting each node in the trees such that the input subset of reduced feature vectors in the child node may be clustered in a manner that conforms to classes. This process may continue until some stopping criteria is met (e.g., the number of random samples in a node is less than a predetermined threshold number, or the depth of the decision tree exceeds a maximum value). This training yields a trained random forest classifier of $N_{tree}$ decision trees and with an output domain of $N_{class}$ classes, which may be configured to classify input feature vectors into classes from among $N_{class}$ based on the training using the low-resolution patches. The process may be repeated for each facial landmark for which high-resolution/low-resolution patch pairs are generated, such as at blocks 202-206.

It should be noted that, as the random forest classifiers may be trained based on the low-resolution patches, and as the low-resolution patches may be paired to corresponding high-resolution patches, during operations to synthesize a high-resolution image, a classification of a low-resolution feature vector may yield a result in the high-resolution domain, as described in more detail below.

Building the Feature Dictionary

Figure 3:
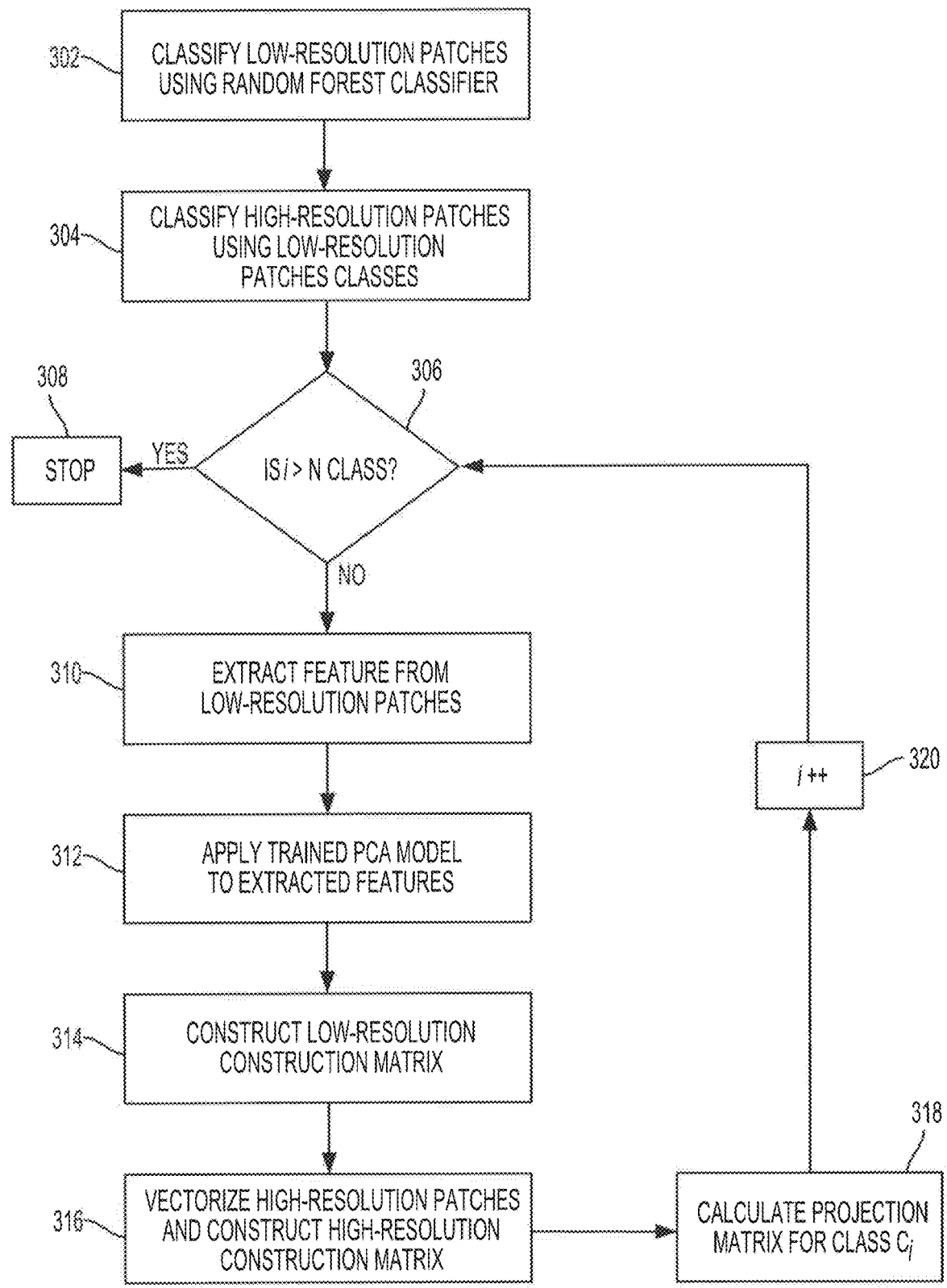
FIG. 3 shows an operational flow diagram illustrating functionality of the dictionary controller to build a feature dictionary in accordance with embodiments of the present invention.

Having described functionality of dictionary controller 140 to train the random forest classifiers of embodiments, reference is now made to FIG. 3, which shows an operational flow diagram illustrating functionality of dictionary controller 140 to build a feature dictionary such as feature dictionary 151. As noted above, feature dictionary 151 comprises projection matrices calculated from the resolution/low-resolution patch pairs, where each projection matrix may correspond to each class in the output domain of the various random forest classifiers.

The operational flow for building feature dictionary 151 may include operations as described above with respect to FIG. 2. For example, at block 302, a trained random forest classifier is used to classify up-sampled low-resolution patches. The training of the random forest classifier was described above with respect to block 216 of FIG. 2. The generation of up-sampled low-resolution patches was also described above with respect to FIG. 2. Thus, the operations described herein with respect to FIG. 3 may include and assume some of the operations described with respect to FIG. 2. As noted above, for each facial landmark, the trained random forest classifiers may be configured to classify up-sampled low-resolution patches into classes. Thus, at block 302, the up-sampled low-resolution patches of the training dataset are classified, using the trained random forest classifiers, into classes. In some embodiments, the classes into which the up-sampled low-resolution patches may be classified may correspond to different variations and/or types associated with the random forest classifier used in the classification. For example, a set of up-sampled low-resolution patches centered on the mouth left corner facial landmark may be classified by the trained random forest classifier based on the type of the mouth left corner. Similarly, low resolution patches centered on other facial landmarks may be classified into different classes of the facial landmark, such as different classes of closed eye, different classes of open mouth, different classes of closed mouth, different classes of cheek, different classes of chin, different classes of nose, different classes of eyebrows, different classes of foreheads, different classes of hair occlusions, different classes of wrinkle of smile, etc. It will be appreciated that the description of these particular types of facial landmarks is for illustrative purposes, and should not be construed as limiting in any way. Any facial landmark may be used, and classes may include any type, variation, difference, deviation, variant, etc. of low-resolution patches centered on the facial landmark.

Each class may include at least one low-resolution patch, or may include a plurality of low-resolution patches. Each low-resolution patch in a class may include differences and variations in the corresponding facial landmark on which the low-resolution patch may be centered from the other low-resolution patches in the same class. For example, for low-resolution patches centered on the mouth left corner, each low-resolution patch may be a different variation of and/or type of the mouth left corner. As noted above, a higher number of low-resolution patches for each facial landmark increases the diversity of types and variations of the facial landmark and may help increase precision of the super-resolution synthesis disclosed herein.

At block 304, given a class $C_i$, where i=1, 2, . . . , $N_{class}$, $N_{class}$ being the number of classes in the output domain of the trained random forest classifier, every high-resolution patch corresponding to a low-resolution patch, such as by being paired, in class $C_i$ is classified as belonging to class $C_i$. Thus, the classification of the high-resolution patches in dictionary 151 may be implemented by applying a corresponding trained random classifier to the corresponding low-resolution patches for a particular facial landmark, rather than the high-resolution patches. The result at block 304 may be that all high-resolution/low-resolution patch pairs may be classified into an appropriate class of patches centered on the respective facial landmark.

The following discussion is directed to operations for calculating a projection matrix, $P_G^{C_i}$, for each class $C_i$ in the output domain of the trained random forest classifier where i=1, 2, . . . , $N_{class}$ based on all of the high-resolution/low-resolution patch pairs in each class. Starting with a first class $C_i$, e.g., where i=1, at block 306 a determination is made as to whether i>$N_{class}$. For example, at block 306, a determination may be made as to whether a projection matrix has been calculated for every class in the output domain of the trained random forest classifier. If at block 306 i≤$N_{class}$, operations proceed to block 309.

At block 309, the low-resolution patches classified as belonging to class $C_i$ may be up-sampled to the size of the high-resolution patches. In embodiments, the operations to up-sample the low-resolution patches may be similar to the up-sampling operations discussed above with respect to FIG. 2. At block 310, a feature vector is extracted from each of the up-sampled low-resolution patches in class $C_i$. The extracted feature vectors may have a particular dimension. For example, for class $C_i$, a feature vector may be extracted from each of the up-sampled low-resolution patches in class $C_i$. In some aspects, each of the feature vectors extracted from the low-resolution patches in class $C_i$ may have a dimension in the order of hundreds, e.g., 300. The features vector extraction at block 310 may be similar to the feature vector extractor functionality described above with respect to FIG. 2.

At block 312, a trained PCA model is applied to the feature vectors extracted from the up-sampled low-resolution patches in class $C_i$ to generate a feature vector with reduced dimensionality for each low-resolution patch in class $C_i$. For example, the feature vectors extracted at block 310 may have dimensions in the order of hundreds, e.g., 300. A trained PCA model may be applied to reduce the feature vectors to reduced feature vectors having dimensions in the order of tens, e.g., 20. In embodiments, the trained PCA model may be the PCA model trained in the random forest classifier training process described above with respect to FIG. 2.

At block 314, the reduced feature vectors obtained at block 312 for each up-sampled low-resolution patch in class $C_i$ are combined to generate a construction matrix $D_l$ for class $C_i$. Construction matrix $D_l$ may include every reduced feature vector from every low-resolution patch in class $C_i$, and may be used to calculate projection matrix $P_G^{C_i}$ for class $C_i$. At block 316, the high-resolution patches in $C_i$ corresponding to the low-resolution patches in $C_i$ may be vec-torized and then combined to generate a construction matrix $D_h$ for class $C_i$. Construction matrix $D_h$, along with construction matrix $D_l$ may be used to calculate projection matrix $P_G^{C_i}$ for class $C_i$.

At block 318, projection matrix $P_G^{C_i}$ for class $C_i$ is calculated based on the constructions matrices $D_h$ and $D_l$. In aspects, projection matrix $P_G^{C_i}$ may be calculated according to the following equation (1).

$$P_G^{C_i}=D_h(D_l^T \cdot D_l+\lambda I)^{-1}D_l^T \qquad (1)$$

where λ represents a constant value determined as a design parameter, T represents a transpose operation, and I represents an identity matrix. In aspects, the calculated projection matrix may be stored in database 150 as part of feature dictionary 151. In embodiments, projection matrix $P_G^{C_i}$ for class $C_i$ may be provided as an output by a decision tree, of a random forest classifier, voting for class $C_i$ for an input low-resolution feature vector during super-resolution synthesis operations. As will be detailed below, the output of all decision trees, e.g., the corresponding projection matrices for the classes voted by all decision trees of a random forest classifier, may be combined and the combination may be used to calculate a high-resolution patch corresponding to the input low-resolution feature vector.

Having calculated a projection matrix $P_G^{C_i}$ for class $C_i$, at block 320, the index i is increased so that a global projection matrix may be calculated for a next class in the output domain of the trained random forest classifier. Thus, operations return to block 306 where a determination is made as to whether a projection matrix has been calculated for every class in the output domain of the trained random forest classifier. If i>$N_{class}$, then operations proceed to block 308 where the process stops. Presumably, at this point, a projection matrix for each class of a random forest classifier has been calculated. In embodiments, the process described in FIG. 3 may be repeated for each random forest classifier corresponding to each of the facial landmarks, as discussed above.

Synthesizing High-Resolution Images

Having trained the random forest classifiers based on low-resolution patches for each corresponding facial landmark and having calculated a projection matrix for each class of the output domain of each random forest classifiers based on the high-resolution/low-resolution patch pairs in each class, feature dictionary 151 may be considered to be built and trained, and configured to facilitate synthesizing of a high-resolution image from a low-resolution image by synthesizer 130 of system 100 in accordance with aspects of the present disclosure.

With reference back to FIG. 1, synthesizer 130 may be configured to synthesize a high-resolution image from a low-resolution input image based on weighted results from a random forest classifier. In aspects, the high-resolution image may be constructed from high-resolution patches calculated using an overall projection matrix. In embodiments, the overall projection matrix may be calculated based on a weighted average of the projection matrices associated with the output class of each decision tree in the random forest classifier. The functionality of synthesizer 130 will now be described with respect to operations illustrated in the operational flow diagram shown in FIG. 4.

Figure 4:
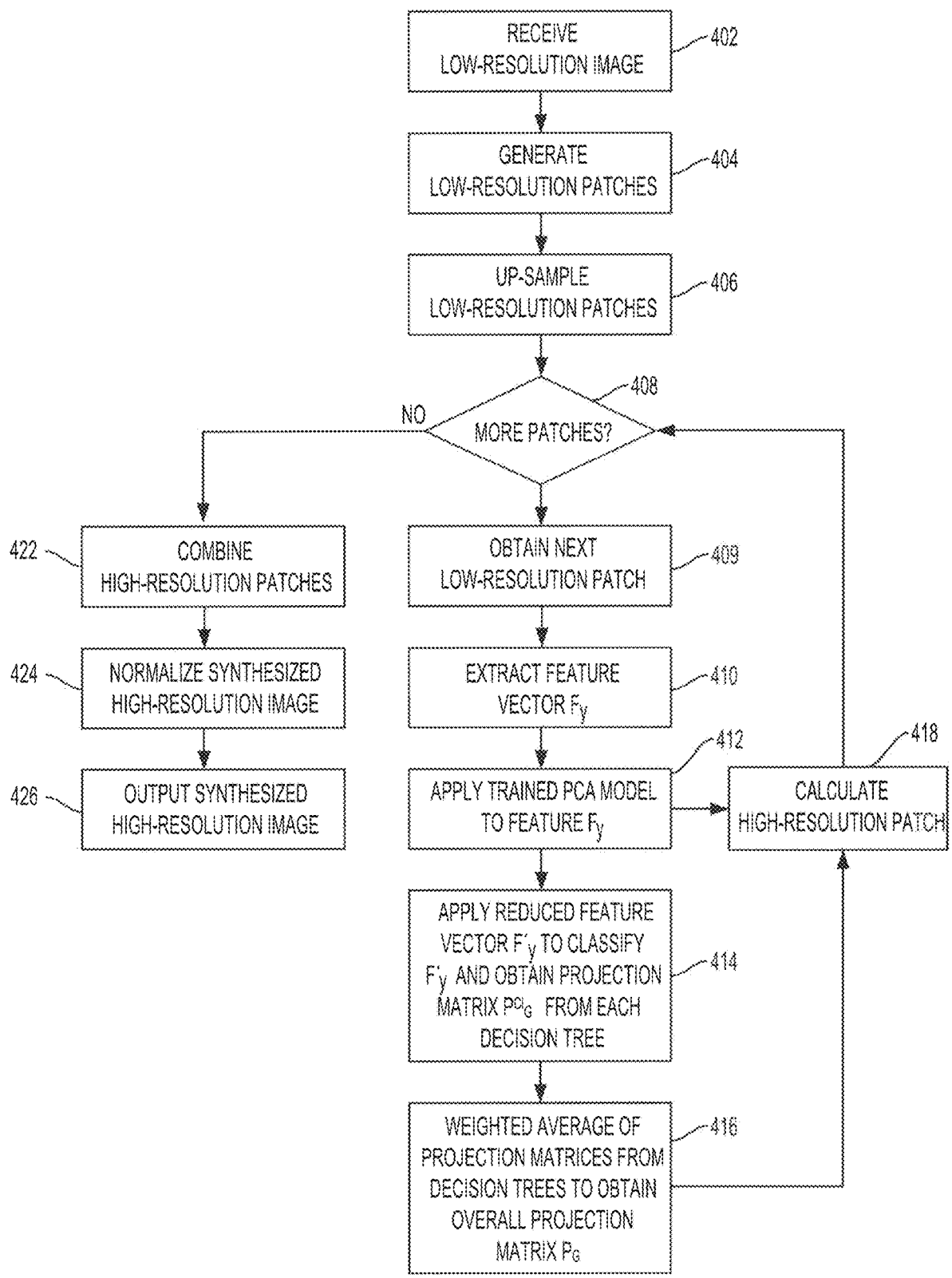
FIG. 4 shows an operational flow diagram illustrating functionality of a synthesizer in accordance with embodiments of the present invention.

The operational flow illustrated in FIG. 4 may include operations that make use of trained random forest classifiers and a trained PCA model. It is noted that, the trained random forest classifiers described with respect to FIG. 4 may refer to the random forest classifiers described with respect to FIGS. 2 and 3. Similarly, the trained PCA model described with respect to FIG. 4 may refer to the PCA model described with respect to FIGS. 2 and 3. Thus, the operations described herein with respect to FIG. 4 may include and assume operations described with respect to FIGS. 2 and 3, especially with respect to the trained random forest classifiers and the trained PCA model.

At block 402, synthesizer 130 receives a low-resolution image as input. In some embodiments, the low-resolution input image may be received from I/O controller 160, and may comprise an image from a streamed video, a recorded video, a still image, etc. In some aspects, the low-resolution input image may be received from an external module or capture device (e.g., a video camera, still image camera, motion picture camera, automation system imaging equipment, etc.).

At block 404, low-resolution patches are generated from the low-resolution input image. In some aspects, the low-resolution input patches may be centered on particular facial landmarks of the low-resolution input image (e.g., facial landmarks, particular objects, particular shapes, etc.). The low-resolution patch generation may be performed using the patch generation process described above with respect to the high-resolution patches generation of FIG. 9. It is noted that, although the patch generation process of FIG. 9 was described with respect to generating high-resolution patches from a high-resolution image, the process may be also applicable for generating low-resolution patches from a low-resolution image, as at block 404. Thus, as with the high-resolution patches, the low-resolution image may be broken up based on facial landmarks and each low-resolution patch generated from a low-resolution image may correspond to a different facial landmark. The size of the low-resolution input patches may be based on a predetermined value, or may be dynamically determined based on the size of the low-resolution input image. For example, each of the low-resolution patches may have a size expressed as a matrix of 16×16 pixels.

At block 406, the low-resolution input patches are up-sampled to a size corresponding to the size of the high-resolution patches used to build feature dictionary 151. For example, the low-resolution input patches may have a size expressed as a matrix of 16×16 pixels. Each of the 16×16 low-resolution input patches may be up-sampled to a 32×32 matrix. In some implementations, the up-sampling of the low-resolution input patches may be performed using bicubic interpolation, or any other technique suitable to up-sample the low-resolution input patches to the size of the high-resolution patches in the feature dictionary 151. In embodiments, the operations to up-sample the low-resolution patches may be similar to the up-sampling operations discussed above with respect to FIG. 2.

The following discussion is directed to operations for calculating a high-resolution patch for each up-sampled low-resolution input patch in the low-resolution input image. At block 408, a determination is made as to whether there are up-sampled low-resolution input patches for which a corresponding high-resolution patch has not been calculated. If it is determined that there are up-sampled low-resolution input patches for which a corresponding high-resolution patch has not been calculated, operations proceed to block 409. At block 409, an up-sampled low-resolution input patch is obtained from the up-sampled low-resolution input patches for which a corresponding high-resolution patch has not been calculated.

At block 410, a feature vector is extracted from the up-sampled low-resolution input patch. The feature vector may be extracted from the up-sampled low-resolution input patch as a feature vector $F_y$, having a particular dimension. For example, a feature vector may be extracted, from the 32×32 up-sampled low-resolution input patch, as an input feature vector of dimension 300. In embodiments, the feature vector extraction operations at block 410 may be similar to the feature vector extraction operations described above with respect to FIG. 2.

At block 412, a trained PCA model is applied to the input feature vector $F_y$, extracted from the up-sampled low-resolution input patch at block 410, to generate a feature vector, $F'_y$, with reduced dimensionality. For example, input feature vector $F_y$ extracted at block 410 may have a dimension in the order of hundreds, e.g., 300. A trained PCA model may be applied to reduce input feature vector $F_y$ to reduced input feature vector $F'_y$, having a dimension in the order of tens, e.g., 20. In embodiments, as mentioned above, the trained PCA model may be the PCA model trained in the random forest classifier training process as described above with respect to FIG. 2.

At block 414, the reduced input feature vector $F'_y$, which corresponds to the low-resolution input patch, is classified using the trained random forest classifier. As noted above, the trained random forest classifier may comprise $N_{tree}$ decision trees and may be configured to classify the reduced input feature vector $F'_y$ into a particular class $C_i$, where i=1, 2, ..., $N_{class}$, $N_{class}$ being the number of classes in the output domain of the trained random forest classifier. During the classification, the reduced input feature vector $F'_y$ may be fed into each decision tree of the random forest classifier. Each decision tree may individually provide a "vote class" for the classification of the reduced input feature vector from among the classes in the output domain of the random forest classifier. In that sense, each decision tree in the random forest classifier may "vote" for a particular class. Some decision trees may vote for a particular class and other decision trees may vote for different classes. In some aspects, some classes may receive no votes, and other classes may receive a plurality of votes. Thus, $N_{tree}$ votes may be obtained for the reduced input feature vector $F'_y$. As described above, each class $C_i$ in the random forest classifier may have a projection matrix $P_G^{C_i}$ associated therewith. As such, the output of each decision tree in the random forest classifier (e.g., the vote from each decision tree) may be taken as the projection matrix $P_G^{C_i}$ associated with the class for which each decision tree may have voted.

At block 416, the output from every decision tree in the random forest classifier is combined to calculate an overall projection matrix, $P_G$, for the reduced input feature vector. In embodiments, the combination of the output from every decision tree may comprise a weighted average calculation in accordance with the following equation (2):

$$P_G = \frac{1}{N_{tree}} \cdot \sum_{i}^{N_{class}} P_G^{C_i} \cdot N_{C_i} \qquad (2)$$

where $N_{C_i}$ is number of decision trees that voted for class $C_i$. As will be appreciated, the overall projection matrix $P_G$ calculated for the low-resolution patch may represent a weighted average of the output of each individual decision tree in the random forest classifier. In this sense, the output of the random forest classifier may not be a particular class in the output domain, but rather a blended class that may correspond to the weighted average of the voted classes. For example, the output of the random forest classifier may indicate that a low-resolution input patch is 80% similar to class A1, 15% similar to class A2, and 5% similar to class A3, where A1, A2, and A3 are voted from decision trees in the random forest classifier.

At block 418, the overall projection matrix $P_G$ calculated for the low-resolution input patch is used to calculate a high-resolution patch x, for the low-resolution input patch. The high-resolution patch may be calculated by combining the overall projection matrix $P_G$ and the reduced feature vector $F'_y$ according to the following formula (3):

$$x = P_G \cdot F'_y \qquad (3)$$

Thus, calculated high-resolution patch x may correspond to the low-resolution input patch based on the random forest classifications and the projection matrices for the associated classifications. In this sense, the variation and/or type of the facial landmark of the low-resolution patch is classified and a high-resolution patch, corresponding to a similar variation and/or type of the facial landmark is calculated, namely high-resolution patch x.

Having calculated a high-resolution patch for the present low-resolution input patch, a high-resolution patch for a next low-resolution input patch in the low-resolution input image may be calculated, if there are low-resolution input patches for which a high-resolution patch has not been calculated. Thus, operations return to block 408 where a determination is made as to whether there are up-sampled low-resolution input patches for which a corresponding high-resolution patch has not been calculated. If there are up-sampled low-resolution input patches for which a corresponding high-resolution patch has not been calculated, a next up-sampled low-resolution input patch may be obtained and a high-resolution patch may be calculated for the next low-resolution input patch according to the description above. However, if there are no more up-sampled low-resolution input patches for which a corresponding high-resolution patch has not been calculated, then operations proceed to block 422.

At block 422, the high-resolution patches calculated for each of the low-resolution input patches of the low-resolution input image are combined and integrated into a high-resolution image. In some aspects, the high-resolution patches may be combined/integrated by stitching every patch together to construct the high-resolution image. As noted above, the high-resolution patches centered on the various landmarks may overlap each other. The high-resolution patches may be combined/integrated by taking an average of pixel values in overlapped regions including different high-resolution patches. For example, a region may be overlapped by three high-resolution patches. In this case, the values of the pixels in the overlapped region may be taken as the average of the pixel values of the three high-resolution patches in the overlapped area. As will be appreciated, the high-resolution image may be a synthesized high-resolution version of the low-resolution input image. Thus, the embodiments described herein provide functionality to enhance a low-resolution image by super-resolution synthesis based on weighted results from a random forest classifier.

At block 424, the high-resolution image constructed from the high-resolution patches is normalized to correct any issues arising from the combination of the high-resolution patches. For example, color, contrast, lines, etc. may be normalized to ensure the high-resolution image is clear and vibrant, and suitable for high-resolution operations such as facial-recognition applications. In some embodiments, normalization may include size normalization. The synthesized image may be normalized by adjusting the size of the synthesized image such that a distance between two points of the face (e.g., the distance between the center of one eye and the center of the other eye) in the synthesized image is a predetermined distance. The size normalization may be applied to all synthesized images. At block 426, the synthesized high-resolution image is output. As will be appreciated, the high-resolution image output may contain similar types and/or variations as in the corresponding low-resolution image, in enhanced resolution, which may facilitate operations in many and various applications, such as face recognition, object recognition, image enhancement, object counting, flow/people-counting, etc.

Face and Head Parallel-Detection in Flow-Counting

The following discussion is directed to an example in which the super-resolution synthesis based on weighted results from a random forest classifier, as discussed above, may be applied. This particular example focuses on a technique for solving problems associated with flow-counting applications, as also discussed above, such as face occlusions and duplicated counting due to the limitations in existing systems. It will be appreciated that although the discussion that follows is directed to flow-counting applications, the super-resolution synthesis techniques disclosed herein may be equally applicable in other scenarios and other applications where synthesizing a high-resolution image from a low-resolution image may be beneficial. For example, the techniques described herein may be used for enhancing images for license plate identification, object counting and/or identification, etc. One application for the techniques disclosed herein may be to avoid duplicated-counting in the flow-counting in digital signage in which advertisements may be displayed according to a statistical figure of passengers passing by (e.g., if a majority of passengers are young ladies, then display advertisements appropriate for young ladies, and if a majority of passengers are middle-aged men, then adjust the advertisement content for middle-aged men. A service provider of digital signage charges the advertiser based on the number of people who pay attention to the advertisement. The super-resolution synthesis of embodiments may be used to analyze/estimate whether a passenger has paid attention to the advertisement displayed in the digital signage. The super-resolution synthesis of embodiments may also be used to identify duplicated-counting in such applications. Another application of the techniques disclosed herein may be to count the number of times, and/or the time instance, the same person has entered a certain area (e.g., a region and/or room of a company/organization/institute/agency, etc.), for statistical, surveillance, and/or security purposes.

Furthermore, the discussion that follows describes an advantageous approach for solving the problems associated with flow-counting applications. As will be discussed, this advantageous approach includes techniques that allow for counting with reduced duplicated counting, higher precision, and a higher detection rate.

Figure 5:
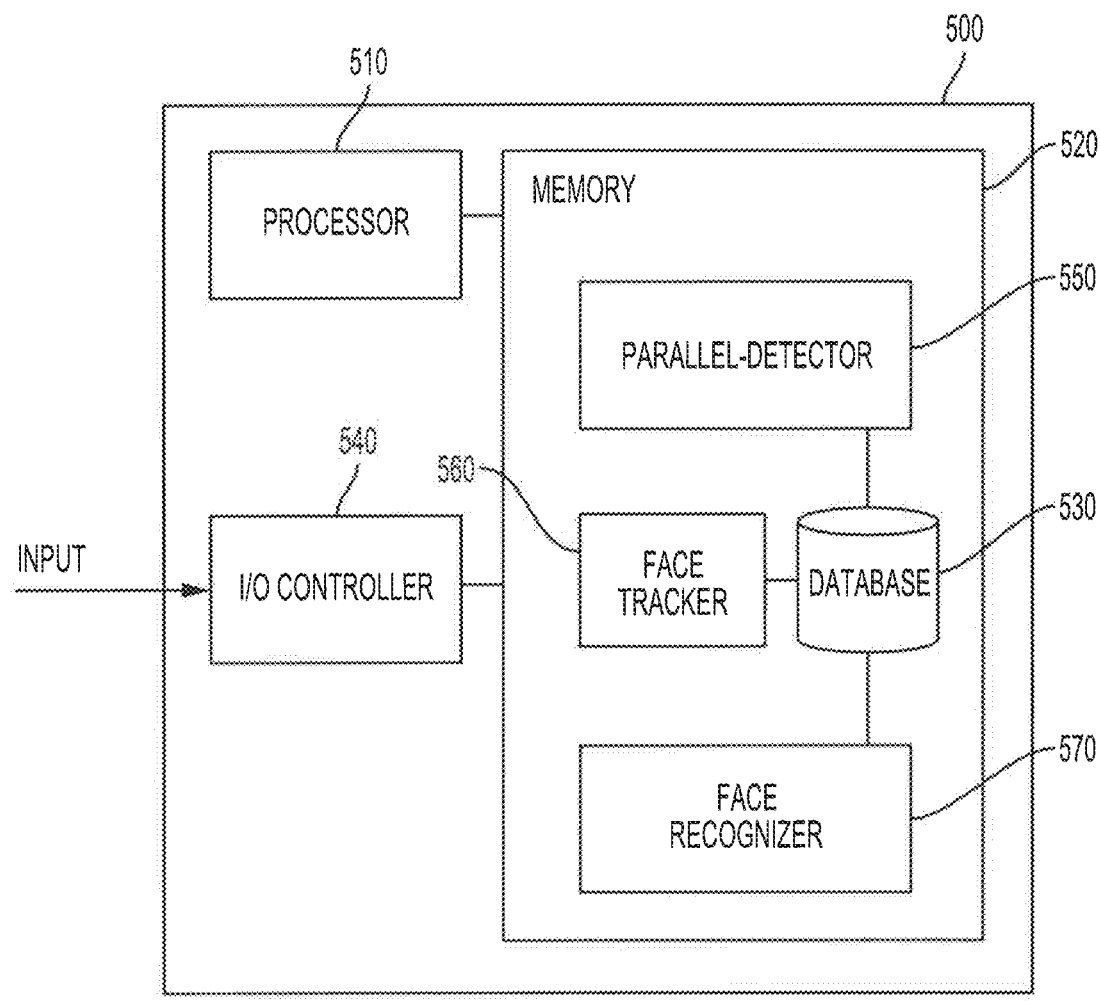
FIG. 5 shows a block diagram of a system configured to provide flow-counting functionality in accordance with embodiments of the present invention.

FIG. 5 shows a block diagram of a system configured to provide flow-counting functionality using face/head parallel-detection and super-resolution synthesis according to embodiments of the invention. System 500 of the illustrated embodiment includes processor 510, memory 520, database 530, input/output (I/O) controller 540, parallel-detector 550, face tracker 560, and face recognizer 570. The various components of system 500 may cooperatively operate to provide functionality in accordance with the discussion herein. In flow-counting operations, a detection of a face may indicate the presence of a person and thus, a people count may be increased due to the detection of the face. However, there may be problems that arise when a face appearing in an earlier image is occluded in a subsequent image. For example, a face appearing in an image at time t may be detected as a face. However, at time t+$\Delta t_1$, the face may be blocked, may be turned such that the face may not be completely visible or visible at all, or may be otherwise occluded such that the face is no longer detected. The face may re-appear at time t+$\Delta t_2$ and may be detected again. In existing systems, the re-detected face may be re-counted. However, operations of the embodiments described herein may operate to prevent such duplicated counting. For example, a set of successive images, representing a period of time for counting traffic flow (e.g., counting people), may be provided as an input to system 500. The various components of system 500 may cooperatively operate to count the number of distinct persons appearing in the set of images. The counting operations may include the face/head parallel-detection and super-resolution synthesis techniques describe herein, which provide a more precise and efficient way of flow-counting over existing systems.

It is noted that, as with the system illustrated in FIG. 1, the functional blocks illustrated in FIG. 5, and components thereof, of system 500 may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

Processor 510 may comprise a processor functionally similar to processor 110 of system 100 shown in FIG. 1. Thus, processor 510 may be implemented in a variety of configurations of hardware, software, and/or a combination thereof. Similarly, memory 520 may be functionally similar to memory 120 of system 100 shown in FIG. 1. Thus, memory 520 may be implemented in a similar manner, from a variety of configurations as described above with respect to memory 120.

Memory 520 may comprise database 530 for storing various components that may be used during flow-counting operations in accordance with aspects of the present disclosure. For example, a face database that may be used in operations for face recognition may be stored by database 530. A variety of projection matrices, face models, feature dictionaries, etc., may also be stored in database 530. Database 530 is illustrated as integrated into memory 520, but may be provided as a separate storage module. Additionally or alternatively, database 530 may be a single database, or may be a distributed database implemented over a plurality of database modules.

I/O controller 540 may be functionally similar to I/O controller 160 of system 100 shown in FIG. 1. Thus, I/O controller 540 may be implemented in a similar manner, from a variety of configurations as described above with respect to I/O controller 160. Hence, I/O controller 540 may be configured to facilitate input and output operations for system 500. In some embodiments, I/O controller 540 may be configured to receive a set of successive images as an input. The set of successive images may represent a continuous capture of images over a period of time, the period of time being a period over which flow-counting is to be performed. In some embodiments, the set of successive images may be received from an external module or device, or may be obtained from database 530. In other embodiments, I/O controller 540 may comprise an image capture device (e.g., a video camera, still image camera, motion picture camera, automation system imaging equipment, etc.) and the set of successive images may be obtained from the capture device. In these embodiments, the image capture device may be arranged such that an optical field of the image capture device may contain a specified area over which flow-counting is to be performed.

Parallel-detector 550 may be configured to provide functionality to detect faces within the set of successive images. The face detection functionality of parallel detector 550 may comprise a technique including parallel detection of heads and faces. Using parallel detection of heads and faces may reduce duplicated counting of people as well as increase the detection rate of faces. The functionality of parallel detector 550 will be discussed in greater detail below.

Face tracker 560 may be configured to receive faces detected by parallel-detector 550 and provide tracking functionality of the faces over the set of successive images. Face tracker 560 may thus track a face over the period of counting and may prevent duplicated counting. However, as noted above, face tracking of a face may fail when a face is occluded. In that case, face tracker 550 may not be able to maintain tracking of the face throughout the period of counting. Nonetheless, it will be appreciated that the flow-counting techniques disclosed herein may mitigate any problems arising from face tracking failures. For example, when face tracking fails, and the face re-appears, existing systems may count the face again. However, applying the techniques herein would prevent duplicate counting, as the face may only be counted if it is a face not previously recognized. These functionalities are discussed in more detail below.

Face recognizer 570 may be configured to provide functionality to recognize faces within the set of successive images. The face recognition functionality may be used to prevent duplicate counting of persons by basing the counting on whether a particular face has been previously recognized. As such, as noted above, when a face re-appears after being occluded, the face may be counted if it is a face not previously recognized. In embodiments, the face recognition functionality of face recognizer 570 may comprise the super-resolution synthesis technique described herein.

Figure 6:
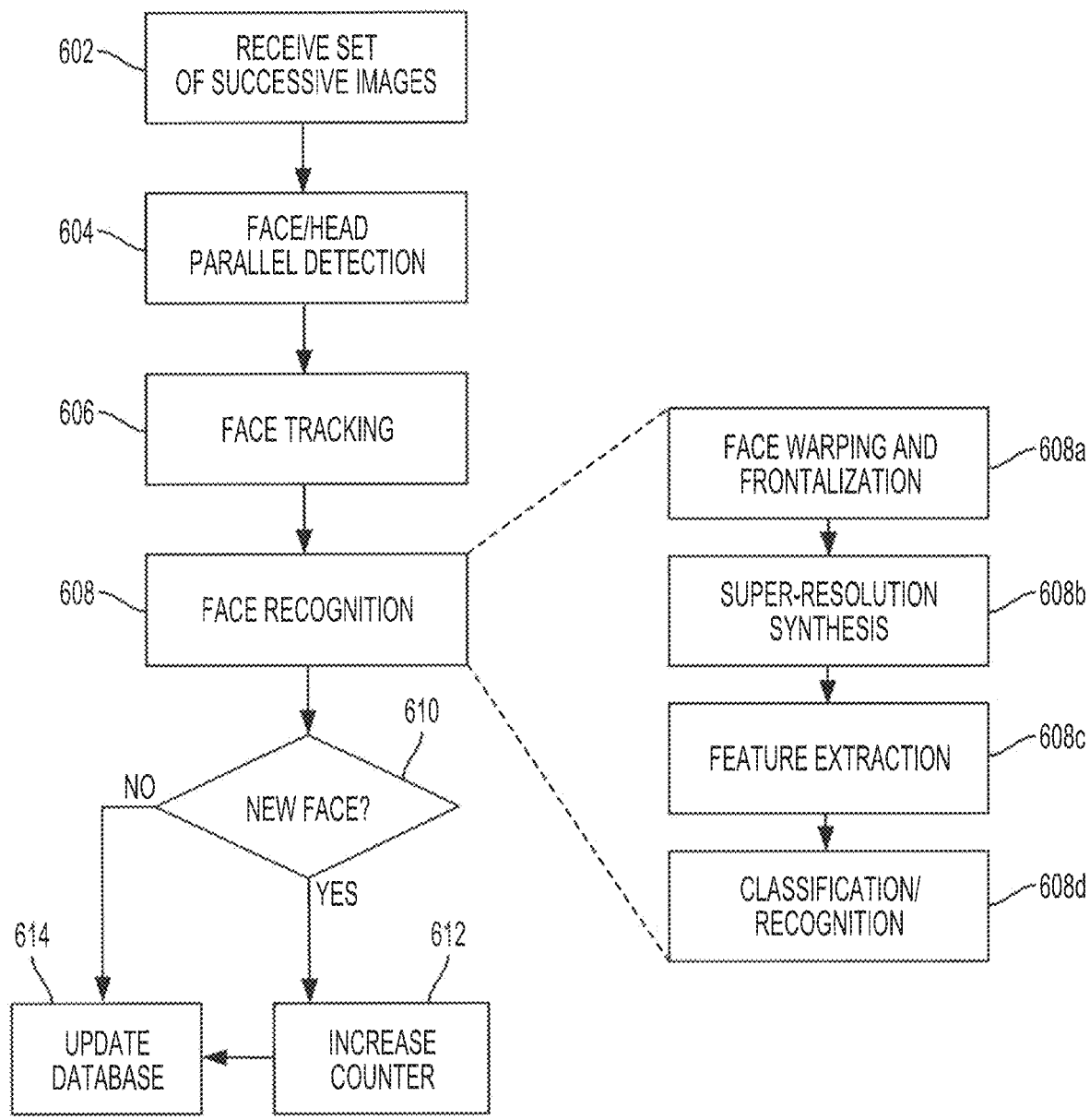
FIG. 6 shows a high level flow diagram of operation of a system configured to provide flow-counting functionality using face/head parallel-detection and super-resolution synthesis in accordance with embodiments of the present invention.

FIG. 6 shows a high level flow diagram of operation of a system configured in accordance with aspects of the present disclosure for providing flow-counting functionality using face/head parallel-detection and super-resolution synthesis. For example, the functions of the process shown in FIG. 6 may be performed by system 500 of FIG. 5 for providing flow-counting functionality using face/head parallel-detection and super-resolution synthesis according to embodiments herein.

At block 602, a set of successive images is received. The set of successive images may represent a continuous capture of images over a particular period of time. The particular period of time may be a period of time over which flow-counting is to be performed. In some aspects, the particular period of time may be specified, and the set of successive images may be taken from a stream of images such that the set of successive images correspond to the images within the particular period of time. In other aspects, a continuous stream of images may be provided, such as a video stream, and the set of successive images may be taken from the stream. In yet other aspects, a particular period of time for flow-counting beginning at a start time and ending at stop time may be specified. In these cases, a continuous image capture may be started at the start time and stopped at the stop time. The resulting set of images may be taken as the set of successive images. In some aspects, the set of successive images may represent images captured over a specified area.

Figure 7:
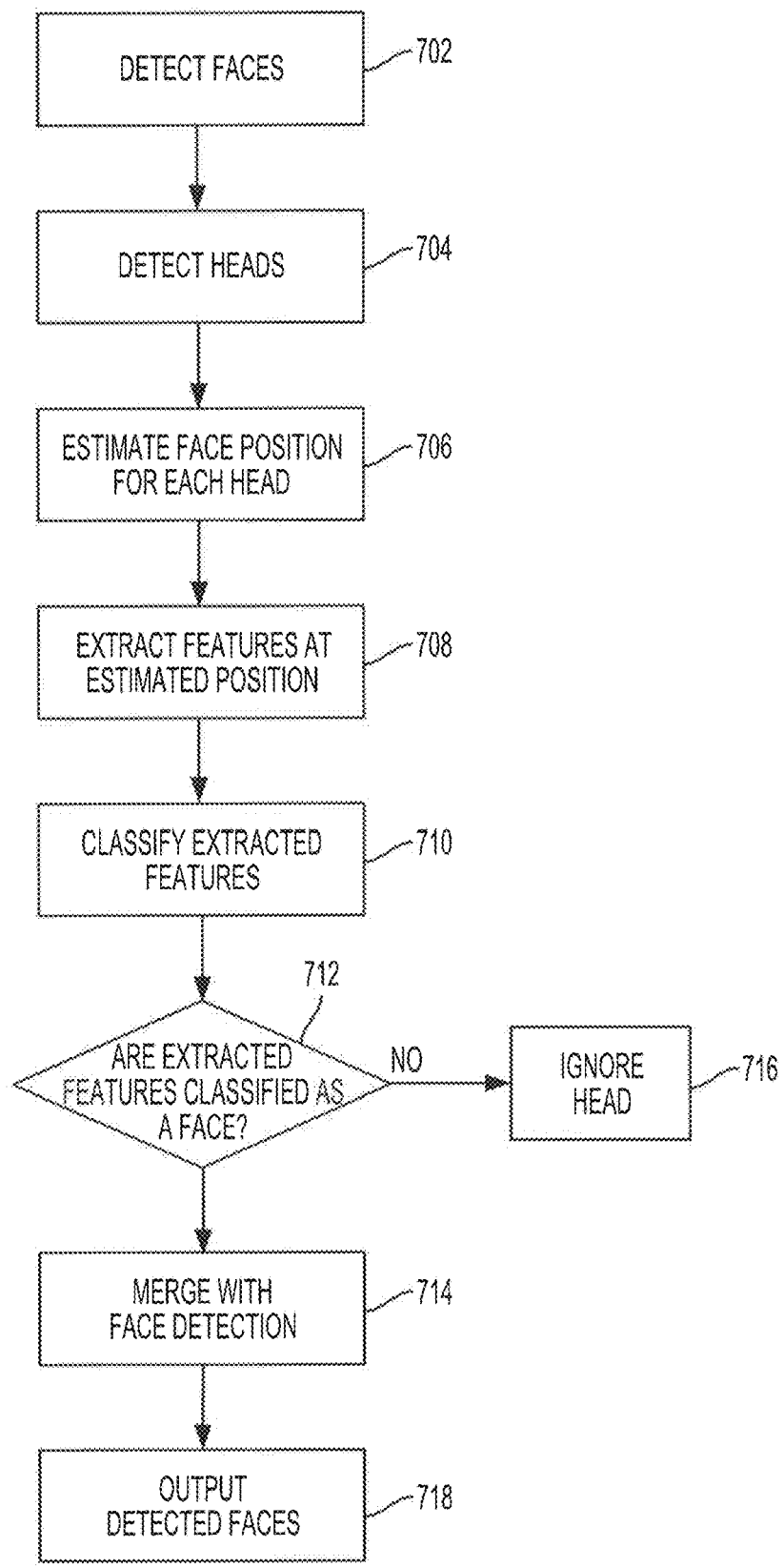
FIG. 7 shows an operational flow diagram illustrating face/head parallel-detection functionality in accordance with embodiments of the present invention.

At block 604, face/head parallel-detection is performed on the set of successive images. Face/head parallel-detection may comprise processing the set of successive images to detect any faces appearing in the set of successive images, based on parallel-detection of faces and heads. FIG. 7 shows a flow diagram illustrating face/head parallel-detection functionality in accordance with aspects of the present disclosure. At block 702, for each image in the set of successive images, face detection is performed to detect any faces in corresponding images. It should be appreciated that this step may detect any face that is not occluded and is not incomplete.

At block 704, for each image in the set of successive images, head detection is performed to detect any heads in the corresponding images. The head detection may be performed in parallel to the face detection step at block 702. Head detection may detect any heads present in the images, which may include the heads of faces detected at block 702, and may also include heads where the face may not be visible and/or detected at block 702. For example, head detection may detect the head of a person who may be walking away from the capture device and whose face may not be visible to the capture device. Similarly, head detection may detect heads where the face may not be fully visible, such as a face that may be partially occluded.

At block 706, the position of a face for each detected head is estimated. For example, based on the position and edges of the detected head, the position of the face within the head may be estimated. At block 708, the estimated position of the face is used to extract the features at the estimated position. At block 710, the extracted features are classified. In aspects, the extracted features may be fed into a classifier to determine if the classification of the features at the estimated position corresponds to a face. For example, although a face may be partially occluded and thus not detected by the face detection at block 702, a classifier may classify the partially occluded face, using the estimated face position of the detected head, as a face. In embodiments, the classifier may include a Support Vector Machine (SVM), K-Nearest-Neighbor (KNN), Naive Bayes Classifier, a Random Forest Classifier, etc.

For each detected head, at block 712, a determination is made as to whether the classification of the extracted features at the estimated face position indicates that the estimated position corresponds to a face. If not, the head is ignored at block 716. However, if it is determined that the classification of the extracted features at the estimated face position indicates that the estimated position corresponds to a face, at block 714, the estimated position of the face is deemed a detected face and is merged with the results of the face detection operation at block 702. The merging of the face detection and the head detection may comprise including in the set of detected faces, any faces detected using the face detection operation, as well as any faces detected using the head detection operations that were not detected using the face detection operation at block 702. At block 718, the set of detected faces is output for use in operations, such as flow-counting operations described herein.

With reference back to FIG. 6, at block 606, face tracking is performed over the set of successive images using the faces detected at block 604. Face tracking may comprise detecting the location of each face throughout the set of successive images, and following the faces as the position of the faces moves throughout the images. As noted above, face tracking in accordance with aspects, may track a face over the period of counting and may prevent duplicated counting by determining that a face at a different location, in a successive image, may be the same face detected previously.

At block 608, face recognition is performed. Face recognition operations may allow system 500 to determine whether a detected face has been previously detected, such as after a face may re-appear, which provides a more precise and robust way of counting people, as the people count may not be increased when a detected face is recognized as a previously detected face. Face recognition may be facilitated by a face database that may be configured to selectively store new faces as the faces are detected and recognized as new faces, and which may be used to determine if recognized faces may already be stored therein. Operations to perform face recognition at block 608 on the detected faces may include face warping and frontalization of the detected faces at block 608a.

Figure 8:
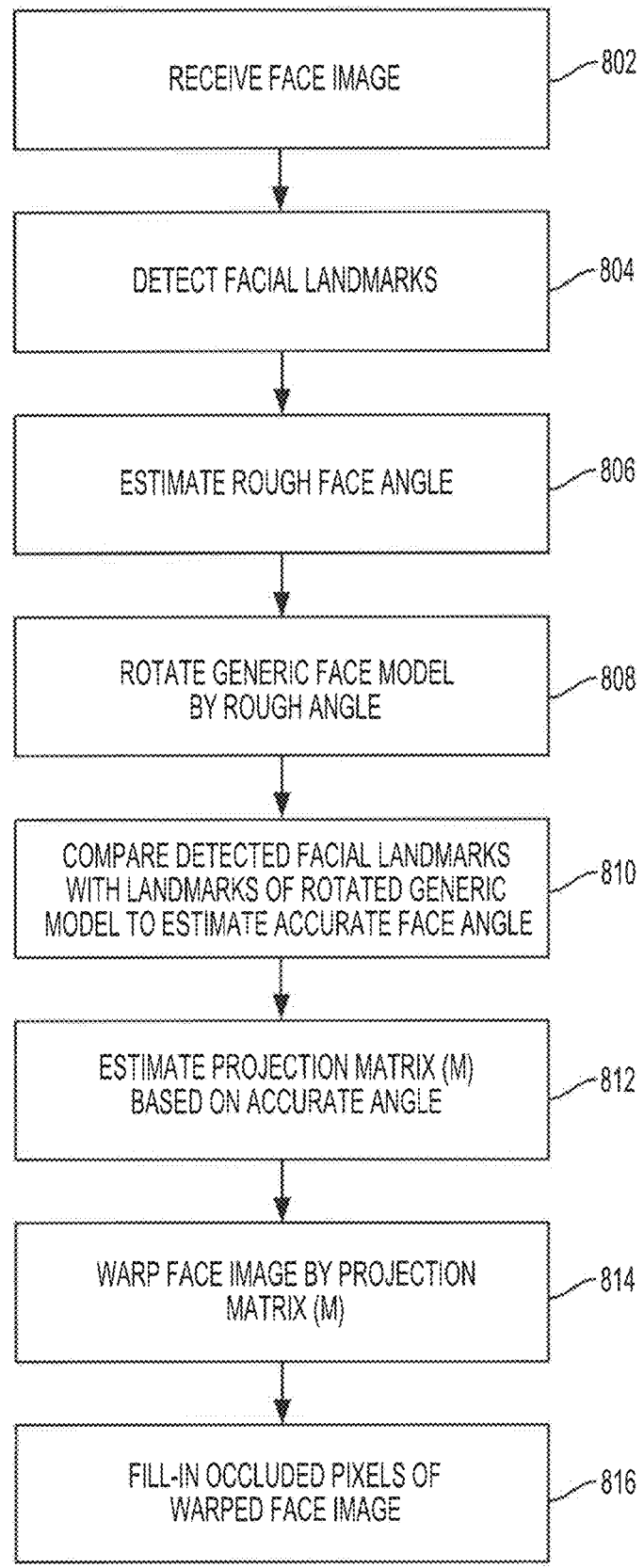
FIG. 8 shows an operational flow diagram illustrating face warping and frontalization functionality in accordance with embodiments of the present invention.

At block 608a, detected faces which may not be oriented frontally, such as faces that are angled with respect to frontal plane of the input image, are warped and frontalized so that the resulting face may be oriented frontally. FIG. 8 shows a flow diagram illustrating face warping and frontalization functionality in accordance with aspects of the present disclosure. At block 802, a detected face image is received. For example, after face/head parallel-detection is performed, each of the detected face images may be provided for face warping and frontalization, as needed. At block 804, facial landmarks of the detected faces in the face images are detected. For example, for a particular detected face, facial landmarks $p_i=(x_i, y_i)^T$ may be identified, where i is the landmark index, and $x_i$ and $y_i$ indicate the coordinates of the landmark in the face image, and T represents a transpose operation. The facial landmarks may then be used to estimate a face angle.

At block 806, a rough estimate of the face angle is calculated. In embodiments, the rough estimate may be obtained by applying a linear classifier to the facial landmarks. The face angle rough estimate may not be very accurate. However, the rough estimate may be used to calculate a more accurate face angle as described below. At block 808, a generic three dimensional (3D) model of a face is rotated by an angle equal to the face angle rough estimate. The generic 3D model may be given by $p_i=(X_i, Y_i, Z_i)^T$. The angle of the rotated generic 3D face model may correspond to the face angle roughly estimated at block 806.

At block 809, the generic 3D model is rotated around the initial face angle rough estimate, in the x, y, and z directions, by a step of predetermined size. For example, in some implementations, the step may have a predetermined size, in degrees, in the order of ones, such as 1°. In these cases, the generic 3D model may be rotated around the initial face angle rough estimate in the x, y, and z directions by 1° per step. At block 810, the position of the facial landmarks detected at block 804 are compared with the position of the landmarks in the rotated generic 3D face model. The comparison may produce a difference value for each landmark, where the difference value indicates the error in the estimation of the face angle at that rotated angle.

In some embodiments, the generic 3D face model may be rotated a threshold number of steps. Thus, at block 811, a determination is made as to whether the generic 3D model has been rotated around the initial face angle rough estimate by a threshold number of steps. If it is determined that the generic 3D face model has not been rotated a threshold number of steps around the initial face angle rough estimate, the generic 3D face model is again rotated by a step around the initial face angle rough estimate at block 809. As will be appreciated, after each rotation step at block 809, the position of the facial landmarks detected at block 804 may be compared at block 810 with the position of the landmarks in the rotated generic 3D face model corresponding to the particular step to determine a difference in the estimation of the face angle at the rotated angle corresponding to the particular step. In one particular example, for steps of 1°, and a threshold number of steps of ±15' around the initial face angle rough estimate, in each of the x, y, and z directions, there may be a total of $30^3=27,000$ rotation steps around the initial face angle rough estimate, and 27,000 comparisons performed. Once the threshold number of steps is reached, the angle of rotation that yields the least error or difference value between the facial landmarks detected at block 804 and the facial landmarks of the generic 3D face model at that angle of rotation may be determined to be the accurate estimate of the face angle.

At block 812, a projection matrix M for face rotation is estimated based on the facial landmarks, the generic 3D face model, and the estimated accurate face angle. For example, a projection matrix M may be estimated as follows:

$$\begin{bmatrix} X_i \\ Y_i \\ Z_i \end{bmatrix} = \begin{bmatrix} r_{00} & r_{01} & r_{02} & t_x \\ r_{10} & r_{11} & r_{12} & t_y \\ r_{20} & r_{21} & r_{22} & t_z \end{bmatrix} \cdot \begin{bmatrix} U \\ V \\ W \\ 1 \end{bmatrix} = [R \ t] \cdot \begin{bmatrix} U \\ V \\ W \\ 1 \end{bmatrix}$$

where $$t = \begin{bmatrix} t_x \\ t_y \\ t_z \end{bmatrix}$$

is the translation vector, $$R = \begin{bmatrix} r_{00} & r_{01} & r_{02} \\ r_{10} & r_{11} & r_{12} \\ r_{20} & r_{21} & r_{22} \end{bmatrix}$$

is the rotation matrix, which is directly related to the rotation angle α, β, and γ in x, y, and z axis according to the following:

$$R_x(\alpha) = \begin{bmatrix} 1 & 0 & 0 \\ 0 & \cos\alpha & \sin\alpha \\ 0 & -\sin\alpha & \cos\alpha \end{bmatrix},$$

$$R_y(\beta) = \begin{bmatrix} \cos\beta & 0 & -\sin\beta \\ 0 & 1 & 0 \\ \sin\beta & 0 & \cos\beta \end{bmatrix},$$

-continued $$R_z(\gamma) = \begin{bmatrix} \cos\gamma & \sin\gamma & 0 \\ -\sin\gamma & \cos\gamma & 0 \\ 0 & 0 & 1 \end{bmatrix}.$$

$$R = R_x(\alpha) \cdot R_y(\beta) \cdot R_z(\gamma), \text{ and } \begin{bmatrix} X_i \\ Y_i \\ Z_i \end{bmatrix} = [R \ t] \cdot \begin{bmatrix} U \\ V \\ W \\ 1 \end{bmatrix}$$

is used to transform 3D points in the world coordinate system to the camera coordinate system. This yields:

$$\begin{bmatrix} x_i \\ y_i \\ 1 \end{bmatrix} = s \cdot \begin{bmatrix} f_x & 0 & c_x \\ 0 & f_y & c_y \\ 0 & 0 & 1 \end{bmatrix} \cdot \begin{bmatrix} X_i \\ Y_i \\ Z_i \end{bmatrix}$$

where $$\begin{bmatrix} f_x & 0 & c_x \\ 0 & f_y & c_y \\ 0 & 0 & 1 \end{bmatrix}$$

is used to project 3D model onto a 2D image, $f_x$ and $f_y$ are focal lengths in the x and y directions, and ($c_x$, $c_y$) is the optical center.

At block 814, the detected face is warped by the projection matrix M calculated at block 812. The result of the rotation may be a frontalized face. However, there may be occluded pixels in the frontalized face due to the rotation. To address this issue, at block 816, occluded pixels are filled in using a conditionally mirrored face image. In this case, the side of the face with non-occluded pixels may be mirrored, and the non-occluded pixels may be used to fill in the occluded pixels in the corresponding mirrored side of the warped face image.

It is noted that the images in the set of successive images may be low-resolution images. Thus, the detected face images, which may have been detected and extracted from the set of successive low-resolution images, may correspondingly be low-resolution face images. With reference back to FIG. 6, at block 608*b*, the low-resolution images of the detected faces, having been appropriately frontalized, are used to synthesize a high-resolution image. It is noted that the super-resolution synthesis performed at block 608*b* may be the super-resolution synthesis of a high-resolution image from a low-resolution image based on weighted results from a random forest classifier of embodiments described above. Thus, the result of block 608*b* may be a synthesized high-resolution image of each detected low-resolution face image.

At block 608*c*, features are extracted from the synthesized high-resolution face images for each detected face, and at block 608*d*, the extracted features are classified and used to perform recognition. Recognition may comprise determining if the classified face matches a face previously detected. For example, at block 610, for each face recognized at block 608, a determination is made as to whether the recognized face may be a new face. The determination may include comparing the recognized face with the faces stored in the face database. If a match is found, the recognized face is considered not to be a new face. In that case, operations continue at block 614, where the database is updated to update the matched face with the recognized face in order to keep the face database up to date. However, if at block 610, a match for the recognized face is not found in the face database, the recognized face may be considered to be a new face. In this case, the people counter is increased at block 612, and the new face is stored in the face database at block 614. This process may be repeated for every recognized face over the entirety of the set of successive images. At the end of the counting period, which may be represented by processing every image in the set of successive images, the people counter may be output as the final flow count.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of synthesizing a high-resolution image from a low-resolution image, the method comprising:
    generating a plurality of low-resolution patches from the low-resolution image;
    up-sampling each low-resolution patch of the plurality of low-resolution patches from the low-resolution image to a size corresponding to high-resolution patches;
    extracting, from each up-sampled low-resolution patch of the plurality of up-sampled low-resolution patches, a feature vector to generate a set of feature vectors;
    applying each feature vector of the set of feature vectors to a corresponding random forest classifier to obtain a class vote, for each feature vector, from each decision tree of the corresponding random forest classifier votes;
    obtaining, for each feature vector, a projection matrix for each voted class by each decision tree to generate a set of projection matrices for each feature vector, wherein each projection matrix in the set of projection matrices for a corresponding feature vector corresponds to a class vote from a decision tree;
    combining projection matrices within each set of projection matrices to generate an overall projection matrix for each feature vector, wherein the combining includes calculating a weighted average for each set of projection matrices based on the projection matrices within each set of projection matrices;
    calculating, for each feature vector, a high-resolution patch based on the overall projection matrix for each feature vector; and
    integrating the high-resolution patch of each feature vector of the set of feature vectors to generate the synthesized high-resolution image.

2. The method of claim 1, wherein each of the low-resolution patches is centered on a different facial landmark of the low-resolution image.

3. The method of claim 1, wherein the calculating the weighted average is according to;

$$P_G = \frac{1}{N_{tree}} \cdot \sum_{i}^{N_{class}} P_G^{C_i} \cdot N_{C_i}$$

where $P_G$ is the overall projection matrix, $N_{tree}$ is a number of decision trees in the corresponding random forest classifier, $N_{class}$ is a number of classes in an output domain of the corresponding random forest classifier, $C_i$ is the voted class, $P_G^{C_i}$ is the projection matrix for voted class $C_i$, and $N_{C_i}$ is a number of decision trees that voted for class $C_i$.

4. The method of claim 3, further comprising applying each feature vector of the set of feature vectors to a trained Principal Component Analysis (PCA) model to generate, for each feature vector, a reduced feature vector prior to applying the feature vectors to the corresponding random forest classifier, wherein the reduced feature vector is a feature vector with reduced dimensionality.

5. The method of claim 4, wherein the calculating, for each feature vector, a high-resolution patch based on the overall projection matrix for each feature vector includes calculating the high-resolution patch according to:

$$x = P_G \cdot F'_y$$

where $F'_y$ is the reduced feature vector, $P_G$ is the overall projection matrix, and x is the high-resolution patch for reduced feature vector $F'_y$.

6. The method of claim 1, further comprising normalizing the size of the synthesized high-resolution image, wherein the normalizing includes adjusting the size of the synthesized high-resolution image such that the distance between two specific points in the synthesized high-resolution image has a predetermined value.

7. The method of claim 1, further comprising training the corresponding random forest classifier, wherein the training comprises:
    obtaining a training set of high-resolution images;
    down-sampling each high-resolution image in the training set of high-resolution images to generate a set of training low-resolution images;
    generating a set of low-resolution training patches for each low-resolution image in the set of training low-resolution images, each low-resolution training patch in the set of low-resolution training patches for each low-resolution image centered on a different facial landmark of the low-resolution image;
    extracting, from each low-resolution training patch in the set of low-resolution training patches for each low-resolution image, a feature vector to generate a set of feature vectors corresponding to each low-resolution image in the set of training low-resolution images; and
    applying the set of feature vectors corresponding to each low-resolution image in the set of training low-resolution images to the corresponding random forest classifier to train the decision trees, wherein the trained decision trees are configured to classify an input feature vector by voting for a class for the input feature vector.

8. The method of claim 7, further comprising up-sampling each low-resolution training patch in the set of low-resolution training patches to a size of the high-resolution patches, wherein the feature vectors are extracted from the up-sampled low-resolution training patches.

9. The method of claim 8, further comprising applying the feature vectors extracted from the up-sampled low-resolution training patches to train a Principal Component Analysis (PCA) model, and applying the trained PCA model to the feature vectors extracted from the up-sampled low-resolution training patches to reduce dimensionalities of the feature vectors prior to applying the feature vectors to the corresponding random forest classifier.

10. The method of claim 7, wherein the high-resolution images in the training set of high-resolution images are selected based on a diversity of variations of high-resolution patches centered on facial landmarks of the high-resolution images such that corresponding low-resolution training patches centered on a same facial landmark contain sufficient variations to synthesize any variations of low-resolution patches centered on the same facial landmark in a corresponding low-resolution image.

11. The method of claim 7, wherein the high-resolution patches are generated from the high-resolution images in the training set of high-resolution images, and wherein each low-resolution training patch in the set of low-resolution training patches is paired with a corresponding high-resolution patch, and further comprising:
classifying low-resolution training patches in the set of low-resolution training patches, using the trained random forest classifier, into a corresponding class;
classifying each high-resolution patch into a class based on the class of the corresponding low-resolution training patch; and
for all pairs of high-resolution/low-resolution patches in a same class:
extracting a feature vector from each low-resolution training patch in the same class;
applying a trained Principal Component Analysis (PCA) model to each of the feature vectors to reduce dimensionalities of the feature vectors;
generating a low-resolution construction matrix from the reduced feature vectors for each low-resolution training patch in the same class;
vectorizing each high-resolution patch in the same class to generate high-resolution feature vectors for the same class;
generating a high-resolution construction matrix from the high-resolution feature vectors in the same class; and
calculating the projection matrix for the same class based on the low-resolution construction matrix and the high-resolution construction matrix.

12. The method of claim 11, wherein the calculating the projection matrix for the same class is according to:

$$P_G^{C_i} = D_h (D_l^T \cdot D_l + \lambda I)^{-1} D_l^T$$

where $C_i$ is a class, $P_G^{C_i}$ is the projection matrix for the class $C_i$, $D_h$ is the high-resolution construction matrix, $D_l$ is the low-resolution construction matrix, $\lambda$ is a predetermined constant, T is a transpose operation, and I is an identity matrix.

13. The method of claim 1, wherein the synthesizing the high-resolution image from a low-resolution image is implemented in a facial-recognition operation for flow-counting.

14. The method of claim 13, wherein the flow-counting includes:
receiving a set of consecutive images;
detecting, in parallel, a head and face in each image of the set of consecutive images to generate a set of detected faces;
applying facial recognition to each face in the set of detected faces to determine faces in the set of detected faces that have previously been undetected;
increasing a counter by a number corresponding to the number of faces in the set of detected faces determined to be previously undetected; and
outputting the counter as a flow counter.

15. The method of claim 14, wherein the detecting, in parallel, a head and face in each image of the set of consecutive images includes:
applying face detection to each image of the set of consecutive images to detect a location of each face in a corresponding image;
applying head detection to each image of the set of consecutive images to detect a location of each head in the corresponding image;
estimating a location of a face within each detected head based on the location of the detected head;
extracting features from the estimated location of the face within each detected head;
classifying the features extracted from the estimated location of the face within each detected head;
determining if the classification indicates that there is a face at the estimated location within each detected head;
merging the estimated location within a corresponding detected head with results from the applying face detection when the classification indicates that there is a face at the estimated location within the corresponding detected head; and
discarding the estimated location within a corresponding detected head when the classification indicates that there is not a face at the estimated location within the corresponding detected head.

16. The method of claim 14, wherein the applying facial recognition includes frontalizing each face in the set of detected faces, wherein the frontalizing includes:
receiving a face image from the set of detected faces;
detecting facial landmarks in the face image;
estimating a rough facial angle of the face image based on the detected facial landmarks;
rotating a generic face model by a plurality of angles around the estimated rough facial angle;
comparing, after rotation of the generic face model by the plurality of angles, a position in a x, y, and z axis of the detected facial landmarks with a position of corresponding facial landmarks of the rotated generic face model at each angle of the plurality of angles;
calculating a difference in the position of the detected facial landmarks and the position of the facial landmarks of the rotated generic face model at each angle of the plurality of angles;
determining an angle of the plurality of angles yielding the closest position of the facial landmarks of the rotated generic face model to the position of the detected facial landmarks;
estimating a rotation projection matrix based on the determined angle yielding the closest position; and
warping the face image using the rotation projection matrix to frontalize the face image.

17. The method of claim 16, further comprising filling occluded pixels of the warped face image using a conditionally mirrored face image based on the face image.

18. A system for synthesizing a high-resolution image from a low-resolution image, the system comprising:
at least one processor; and
memory coupled to the at least one processor, wherein the at least one processor is configured with logic to:
generate a plurality of low-resolution patches from the low-resolution image;
up-sample each low-resolution patch of the plurality of low-resolution patches from the low-resolution image to a size corresponding to high-resolution patches;
extract, from each up-sampled low-resolution patch of the plurality of up-sampled low-resolution patches, a feature vector to generate a set of feature vectors;
applying each feature vector of the set of feature vectors to a trained Principal Component Analysis (PCA) model to generate, for each feature vector, a reduced feature vector in a set of reduced feature vector, wherein the reduced feature vector is a feature vector with reduced dimensionality;
apply each reduced feature vector of the set of reduced feature vectors into a corresponding random forest classifier to obtain a class vote, for each feature vector, from each decision tree of the corresponding random forest classifier votes;
obtain, for each feature vector, a projection matrix for each voted class by each decision tree to generate a set of projection matrices for each feature vector, wherein each projection matrix in the set of projection matrices for a corresponding feature vector corresponds to a class vote from a decision tree;
combine projection matrices within each set of projection matrices to generate an overall projection matrix for each feature vector, wherein combining includes calculating a weighted average for each set of projection matrices based on the projection matrices within each set of projection matrices;
calculate, for each feature vector, a high-resolution patch based on the overall projection matrix for each feature vector; and
integrate the high-resolution patch of every feature vector of the set of feature vectors to generate the synthesized high-resolution image.

19. The system of claim 18, wherein the at least one processor is further configured with logic to train the corresponding random forest classifier, wherein the logic to train the corresponding random forest classifier comprises logic to:
obtain a training set of high-resolution images;
down-sample each high-resolution image in the training set of high-resolution images to generate a set of training low-resolution images;
generate a set of low-resolution training patches for each low-resolution image in the set of training low-resolution images;
extract, from each low-resolution training patch in the set of low-resolution training patches for each low-resolution image, a training feature vector to generate a set of training feature vectors corresponding to each low-resolution image in the set of training low-resolution images;
apply each training feature vector of the set of training feature vectors to the trained PCA model to generate, for each training feature vector, a reduced training feature vector in a set of reduced training feature vector, wherein the reduced training feature vector is a feature vector with reduced dimensionality; and
apply the set of reduced training feature vectors corresponding to each low-resolution image in the set of training low-resolution images to the corresponding random forest classifier to train the decision trees, wherein the trained decision trees are configured to classify an input feature vector by voting for a class for the input feature vector.

20. A method of flow-counting, the method comprising:
detecting, in parallel, a head and face in each image of a set of consecutive images to generate a set of detected faces, wherein the detecting includes:
applying face detection to each image of the set of consecutive images to detect a location of each face in a corresponding image;
applying head detection to each image of the set of consecutive images to detect a location of each head in the corresponding image;
estimating a location of a face within each detected head based on the location of the detected head;
extracting features from the estimated location of the face within each detected head;
classifying the features extracted from the estimated location of the face within each detected head;
determining if the classification indicates that there is a face at the estimated location within each detected head;
merging the estimated location within a corresponding detected head with results from the applying face detection when the classification indicates that there is a face at the estimated location within the corresponding detected head;
discarding the estimated location within a corresponding detected head when the classification indicates that there is not a face at the estimated location within the corresponding detected head; and
generating a set of detected face images from the merged results;
synthesizing a high-resolution image for each face image in the set of detected face images to facilitate face recognition, wherein the synthesizing includes:
generating a set of low-resolution patches from each face image;
up-sampling each low-resolution patch of the set of low-resolution patches to a size corresponding to high-resolution patches;
extracting, from each up-sampled low-resolution patch of the plurality of up-sampled low-resolution patches, a feature vector to generate a set of feature vectors;
applying each feature vector of the set of feature vectors to a trained Principal Component Analysis (PCA) model to generate, for each feature vector, a reduced feature vector in a set of reduced feature vector, wherein the reduced feature vector is a feature vector with reduced dimensionality;
applying each reduced feature vector of the set of reduced feature vectors into a corresponding random forest classifier to obtain a class vote, for each feature vector, from each decision tree of the corresponding random forest classifier votes;
obtaining, for each feature vector, a projection matrix for each voted class by each decision tree to generate a set of projection matrices for each feature vector, wherein each projection matrix in the set of projection matrices for a corresponding feature vector corresponds to a class vote from a decision tree;

combining projection matrices within each set of projection matrices to generate an overall projection matrix for each feature vector, wherein the combining includes calculating a weighted average for each set of projection matrices based on the projection matrices within each set of projection matrices;

calculating, for each feature vector, a high-resolution patch based on the overall projection matrix for each feature vector; and integrating the high-resolution patch of each feature vector of the set of feature vectors to generate the synthesized high-resolution image;

applying facial recognition to each synthesized high-resolution image corresponding to a face image to determine faces in the synthesized high-resolution images that have previously been undetected; and increasing a counter by a number corresponding to the number of faces in the synthesized high-resolution images determined to be previously undetected.

* * * * *